US011794488B2

(12) United States Patent
Lyman et al.

(10) Patent No.: US 11,794,488 B2
(45) Date of Patent: Oct. 24, 2023

(54) CRADLE APPARATUS AND PRINTING DEVICE INTERFACE

(71) Applicant: ZEBRA TECHNOLOGIES CORPORATION, Lincolnshire, IL (US)

(72) Inventors: Roy P. Lyman, Coventry, RI (US); Zhong Gui Wang, Guangzhou (CN); David F. Beck, Exeter, RI (US); Anthony Ross Helberg, Attleboro, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 1116 days.

(21) Appl. No.: 16/289,325

(22) Filed: Feb. 28, 2019

(65) Prior Publication Data

US 2019/0193437 A1 Jun. 27, 2019

Related U.S. Application Data

(63) Continuation of application No. 15/455,680, filed on Mar. 10, 2017, now Pat. No. 10,252,554, which is a
(Continued)

(51) Int. Cl.
*B41J 29/06* (2006.01)
*B41J 29/02* (2006.01)
(Continued)

(52) U.S. Cl.
CPC ............... *B41J 3/36* (2013.01); *B41J 29/023* (2013.01); *B41J 29/06* (2013.01); *B41J 29/13* (2013.01);
(Continued)

(58) Field of Classification Search
CPC . B41J 29/06; B41J 29/023; B41J 29/13; B41J 29/04; B41J 3/36; G06F 1/1632;
(Continued)

(56) References Cited

U.S. PATENT DOCUMENTS 5,180,232 A 1/1993 Chadima, Jr. et al.
5,347,115 A 9/1994 Sherman et al.
(Continued)

FOREIGN PATENT DOCUMENTS

WO 2011130319 A1 10/2011

*Primary Examiner* — Justin Seo
*Assistant Examiner* — Kendrick X Liu

(57) ABSTRACT

An embodiment of a cradle has a cradle body configured to support a printing device. The cradle has first and second printer capture flanges extending from the cradle body proximate a capture end of the cradle body. The cradle has first and second biased latches extending from the cradle body between the capture end and a release end of the cradle body. The cradle has a biased release member movable between a first position and a release position. The cradle has a release linkage supported by the cradle body, the release linkage coupling the biased release member and the first and second biased latches, wherein the release linkage is structured to drive the first and second biased latches from respective locked positions to respective unlocked positions in response to movement of the biased release member from a first position to a release position.

22 Claims, 16 Drawing Sheets

Related U.S. Application Data continuation of application No. 14/623,224, filed on Feb. 16, 2015, now Pat. No. 9,623,690.

(51) Int. Cl.
| | |
|---|---|
| *B41J 29/13* | (2006.01) |
| *B41J 29/04* | (2006.01) |
| *B41J 3/36* | (2006.01) |
| *G06F 1/16* | (2006.01) |
| *G07G 5/00* | (2006.01) |
| *H01R 33/76* | (2006.01) |
| *H01R 33/00* | (2006.01) |

(52) U.S. Cl.
CPC ............. *G06F 1/1632* (2013.01); *G07G 5/00* (2013.01); *H01R 33/00* (2013.01); *H01R 33/765* (2013.01); *H01R 33/7664* (2013.01); *B41J 29/02* (2013.01); *B41J 29/04* (2013.01)

(58) Field of Classification Search
CPC ........ G07G 5/00; H01R 33/76; H01R 33/765; H01R 33/7664
See application file for complete search history.

(56) References Cited

U.S. PATENT DOCUMENTS

| | | |
|---|---|---|
| 6,046,571 A | 4/2000 | Bovio et al. |
| D440,936 S | 4/2001 | Burns |
| D446,854 S | 4/2001 | Cheney, II et al. |
| 6,264,488 B1 | 7/2001 | Helot et al. |
| 6,461,189 B1 | 10/2002 | Koh |
| D469,097 S | 1/2003 | Liu |
| 6,736,669 B1 | 5/2004 | Martin et al. |
| 6,916,128 B1 | 7/2005 | Petteruti et al. |
| 6,984,144 B1 | 1/2006 | Nelson et al. |
| 6,986,685 B2 | 1/2006 | Wang et al. |
| D519,450 S | 4/2006 | Lyman et al. |
| D520,946 S | 5/2006 | Nasu |
| D521,450 S | 5/2006 | Stratford |
| 7,103,760 B1 | 9/2006 | Billington et al. |
| 7,104,830 B1 | 9/2006 | Diaz |
| 7,540,748 B2 | 6/2009 | Tracy et al. |
| D620,882 S | 8/2010 | Houghton |
| 8,045,050 B2 | 10/2011 | Nogo et al. |
| D673,113 S | 12/2012 | Fowler |
| 8,366,469 B2 | 2/2013 | Carnevali |
| D692,895 S | 11/2013 | Iwata et al. |
| D711,314 S | 8/2014 | Marino et al. |
| 8,821,173 B2 | 9/2014 | Carnevali |
| D723,548 S | 3/2015 | Martinez |
| D743,330 S | 11/2015 | Zhang |
| D771,051 S | 11/2016 | Beck et al. |
| 9,623,690 B2 * | 4/2017 | Lyman ................ H01R 33/00 |
| 2003/0136889 A1 | 7/2003 | Paramonoff et al. |
| 2004/0150368 A1 | 8/2004 | Horigome |
| 2006/0024107 A1 * | 2/2006 | Lyman .................. B41J 29/023 400/88 |
| 2006/0092141 A1 | 5/2006 | Amani et al. |
| 2007/0076045 A1 * | 4/2007 | James ................. B41J 2/16547 347/29 |
| 2011/0043579 A1 | 2/2011 | Leppanen |
| 2012/0276775 A1 | 11/2012 | Garwood et al. |
| 2013/0021164 A1 | 1/2013 | Heaton |
| 2013/0217265 A1 | 8/2013 | Schlaepfer et al. |
| 2015/0371071 A1 | 12/2015 | Ciabattoni |
| 2016/0236493 A1 | 8/2016 | Lyman et al. |

\* cited by examiner

CRADLE APPARATUS AND PRINTING DEVICE INTERFACE

RELATED APPLICATION

This patent arises from a continuation of U.S. patent application Ser. No. 15/455,680, filed on Mar. 10, 2017, which is a continuation of U.S. patent application Ser. No. 14/623,224, filed on Feb. 16, 2015, which are hereby incorporated herein by reference.

FIELD OF THE INVENTION

Embodiments discussed herein are related to mobile printer docking and charging devices (also referred to herein as mobile printer cradles or simply "cradles") and, more particularly, to systems, methods, apparatuses, and other means for providing mobile printer docking, charging, interfacing, networking and related functionality.

BACKGROUND

Applicant has discovered various problems associated with printer docks and charging devices. Through applied effort, ingenuity, and innovation, Applicant has solved many of these identified problems by developing a solution that is embodied by the present invention as described in detail below.

BRIEF SUMMARY

Systems, methods, apparatuses, and computer readable media disclosed herein are related to a cradle, printing device, and/or other external devices.

The cradle may comprise a cradle body configured to support a printing device, the cradle body defining an extended battery cavity, first and second printer capture flanges extending from the cradle body and disposed proximate a first side of the extended battery cavity, each of the first and second printer capture flanges defining support portion and a capture portion, first and second biased latches extending from the cradle body and disposed proximate a second side of the extended battery cavity, each of the first and second biased latches defining a printer drive surface and a lock surface, and a communication port extending from the cradle body proximate the second side of the extended battery cavity between the first and second biased latches, wherein the communication port is configured to receive a communication connector of the printing device and thereby facilitate electrical communication between the cradle and the printing device.

In some embodiments, the cradle is configured for four-point attachment comprising the first and the second printer capture flanges and the first and the second biased latches.

In some embodiments, the first and the second biased latches are configured to define a latch height.

In some embodiments, the first and the second biased latches are configured to receive a biasing force between 5 and 10 lbs.

In some embodiments, the first and second biased latches are driven rearward in opposition to a biasing force applied to the first and second biased latches.

In some embodiments, the printer drive surface and the lock surface define a locking angle.

In some embodiments, the first and the second printer capture flanges are configured to define a flange height.

In some embodiments, the first and the second printer capture flanges are comprised of metal.

In some embodiments, the support portion and the capture portion define a capture angle.

In some embodiments, the support portion and the first side portion define a supporting angle.

In some embodiments, the first and the second biased latches are configured to move between a locked position and an unlocked position.

In some embodiments, the first and second biased latches are spring biased toward the locked position.

In some embodiments, the first and second biased latches are driven from a locked position to an unlocked position by a release linkage in response to a user driving a biased release member from a first position to a release position.

In some embodiments, the extended battery cavity is configured to receive a secondary battery, and wherein the secondary battery is configured to extend electrical energy provided by a primary battery.

A printing device comprising a printer body, a cradle engagement surface configured to interface with a cradle, the cradle engagement surface defining a first recess and a second recess disposed proximate a first side of a battery compartment, and a bumper attachment extending from the printer body and disposed proximate a front side of the printer body, the bumper attachment defining at least two capture cavities structured to slideably receive reciprocally structured first and second printer capture flanges extending from the cradle.

In some embodiments, the first recess and the second recess are configured to receive first and second biased latches extending from the cradle, the first recess and the second recess comprising first and second recess walls.

In some embodiments, the first and second biased latches are configured to snap into the first recess and the second recess, and wherein a bottom wall of the cradle engagement surface proximate the first recess and the second recess is captured into cavities defined by a lock surface of the first and second biased latches.

In some embodiments, the first and second latches comprising a locking angle and a driving angle move to a locked position in response to the first and second recess walls interface with the locking angle and the driving angle.

In some embodiments, the plurality of capture cavities comprises at least two capture cavities defined by a left bumper cavity side, right bumper cavity side, top bumper cavity side, and bottom bumper cavity side.

In some embodiments, the bumper attachment defines two capture cavities structured to slidably receive first and second printer capture flanges.

In some embodiments, the bumper attachment defines two capture cavities positioned to slidably receive first and second printer capture flanges.

In some embodiments, the top bumper cavity side and the right bumper cavity side form a first angle.

In some embodiments, the right bumper cavity side and the bottom bumper cavity side form a second angle.

In some embodiments, the bottom bumper cavity side and the left bumper cavity side form a third angle.

In some embodiments, the left bumper cavity side and the top bumper cavity side form a fourth angle.

In some embodiments, the bumper attachment is configured to remain securely attached to the printing device in response to a depressed contact on a surface of a biased release member that extends from the cradle.

In some embodiments, portions of the cradle engagement surface disposed proximate the first recess and the second recess are configured to drive downwardly into a printer drive surface of the first and second biased latches.

A cradle comprising a cradle body configured to support a printing device, the cradle body defining capture end and release end, first and second printer capture flanges extending from the cradle body proximate the capture end of the cradle body, each of the first and second printer capture flanges defining a support portion and a capture portion, first and second biased latches extending from the cradle body between the capture end and release end of the cradle body, each of the first and second biased latches defining printer drive surface and a lock surface, wherein each of the first and second biased latches are movable between a locked position and an unlocked position, a biased release member movable between a first position and a release position, and a release linkage supported by the cradle body, the release linkage coupling the biased release member and the first and second biased latches, wherein the release linkage is structured to drive the first and second biased latches from respective locked positions to respective unlocked positions in response to movement of the biased release member from a first position to a release position.

In some embodiments, the biased release member is configured to actuate the release linkage.

In some embodiments, the release linkage is configured to transfer and transform rotational pressing movement applied to the biased release member into a linear force, and wherein the linear force is configured to drive the first and second biased latches rearward against a biasing force.

In some embodiments, the release linkage comprises a connecting member configured to drive one or more tabs in response to the biased release member being moved into the release position, and a spring configured to drive the first and second biased latches from the locked position to the unlocked position.

In some embodiments, the spring is configured to oppose a pressing force applied to the biased release member.

In some embodiments, the connecting member is a lever.

In some embodiments, the biased release member is configured to actuate a spring-biased release of the printing device from the cradle body.

In some embodiments, the first and the second biased latches are actuated in response to a user driving the biased release member from the first position to the release position.

In some embodiments, the release member is positioned such that the biased release member may be driven by fingers of single hand of the user.

In some embodiments, the biased release member comprises a spring configured to compress or extend at a predetermined rate.

In some embodiments, the cradle body further defines an upper neck surface disposed between first and a second shoulder surfaces.

In some embodiments, the upper neck surface and the first and second shoulder surfaces define neck supporting angles.

In some embodiments, the neck supporting angles are between the range 0 to 100 degrees.

In some embodiments, the biased release member extends from the upper neck surface.

In some embodiments, the biased release member extends from the cradle body.

In some embodiments, the biased release member extends outwardly in response to a depressed contact performed by a user on the surface of the biased release member.

In some embodiments, the biased release member comprises a spring configured to oppose a pressing force applied to the biased release member.

In some embodiments, the biased release member comprise an angular contact surface structured to accommodate an arc of a hand produced by at least a portion of a hand.

In some embodiments, the angular contact surface comprises one or more ridged surfaces.

In some embodiments, the biased release member further defines a pivoting member configured to turn or pivot the biased release member from the first position to the release position.

In some embodiments, the cradle further comprises one or more device receivers housed in an internal cavity defined by the cradle body, the one or more device receivers configured to communicate with one or more external devices.

In some embodiments, the one or more device receivers are further configured to supply electrical energy to the one or more external devices.

In some embodiments, the one or more device receivers are configured to define a peripheral strain reliever, and wherein the peripheral strain reliever is at least partially recessed within the cradle body.

In some embodiments, the peripheral strain reliever is coupled to the one or more external devices.

In some embodiments, the cradle body further comprises a bottom surface defining one or more drains and one or more protrusions configured for mounting on a surface.

A method of manufacturing a cradle for supporting a printing device, the method comprising providing a cradle body defining an extended battery cavity, extending first and second printer capture flanges from the cradle body proximate a first side of the extended battery cavity, each of the first and second printer capture flanges defining a support portion and a capture portion, extending first and second biased latches from the cradle body proximate a second side of the extended battery cavity, each of the first and second biased latches defining a printer drive surface and a lock surface, and extending a communication port from the cradle body proximate the second side of the extended battery cavity between the first and second biased latches, wherein the communication port is configured to receive a communication connector of the printing device and thereby facilitate electrical communication between the cradle and the printing device.

A method of manufacturing a printing device to interface with a cradle, the method comprising providing a printer body and a cradle engagement surface defining a first recess and a second recess disposed proximate a first side of a battery compartment, and extending a bumper attachment from the printer body and disposing the bumper attachment proximate a front side of the printer body, the bumper attachment defining at least two capture cavities structured to slideably receive reciprocally structured first and second printer capture flanges extending from the cradle.

A method of manufacturing a cradle for supporting a printing device, the method comprising providing a cradle body defining capture end and release end, extending first and second printer capture flanges from the cradle body proximate the capture end of the cradle body, each of the first and second printer capture flanges defining a support portion and a capture portion, extending first and second biased latches from the cradle body between the capture end and release end of the cradle body, each of the first and second biased latches defining printer drive surface and a lock surface, wherein each of the first and second biased latches are movable between a locked position and an unlocked position, extending a biased release member movable between a first position and a release position from the cradle body, and coupling, via a release linkage supported by the cradle body, the biased release member and the first and second biased latches, wherein the release linkage is structured to drive the first and second biased latches from respective locked positions to respective unlocked positions in response to movement of the biased release member from a first position to a release position.

A computer program product comprising at least one non-transitory computer-readable storage medium having computer-executable program code portions stored therein, the computer-executable program code portions comprising program code instructions for configuring a cradle comprising a cradle body to support a printing device, the cradle body defining an extended battery cavity, extending first and second printer capture flanges from the cradle body and disposing the first and second printer capture flanges proximate a first side of the extended battery cavity, each of the first and second printer capture flanges defining a support portion and a capture portion, extending first and second biased latches from the cradle body and disposing the first and second biased latches proximate a second side of the extended battery cavity, each of the first and second biased latches defining a printer drive surface and a lock surface, and extending a communication port from the cradle body proximate the second side of the extended battery cavity between the first and second biased latches, wherein the communication port is configured to receive a communication connector of the printing device and thereby facilitate electrical communication between the cradle and the printing device.

A computer program product comprising at least one non-transitory computer-readable storage medium having computer-executable program code portions stored therein, the computer-executable program code portions comprising program code instructions for configuring a printing device comprising a printer body and a cradle engagement surface to interface with a cradle, the cradle engagement surface defining a first recess and a second recess disposed proximate a first side of a battery compartment, and extending a bumper attachment from the printer body and disposing the bumper attachment proximate a front side of the printer body, the bumper attachment defining at least two capture cavities structured to slideably receive reciprocally structured first and second printer capture flanges extending from the cradle.

A computer program product comprising at least one non-transitory computer-readable storage medium having computer-executable program code portions stored therein, the computer-executable program code portions comprising program code instructions for configuring a cradle comprising a cradle body to support a printing device, the cradle body defining capture end and release end, extending first and second printer capture flanges from the cradle body proximate the capture end of the cradle body, each of the first and second printer capture flanges defining a support portion and a capture portion, extending first and second biased latches from the cradle body between the capture end and release end of the cradle body, each of the first and second biased latches defining printer drive surface and a lock surface, wherein each of the first and second biased latches are movable between a locked position and an unlocked position, extending a biased release member movable between a first position and a release position from the cradle body, and coupling, via a release linkage supported by the cradle body, the biased release member and the first and second biased latches, wherein the release linkage is structured to drive the first and second biased latches from respective locked positions to respective unlocked positions in response to movement of the biased release member from a first position to a release position.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
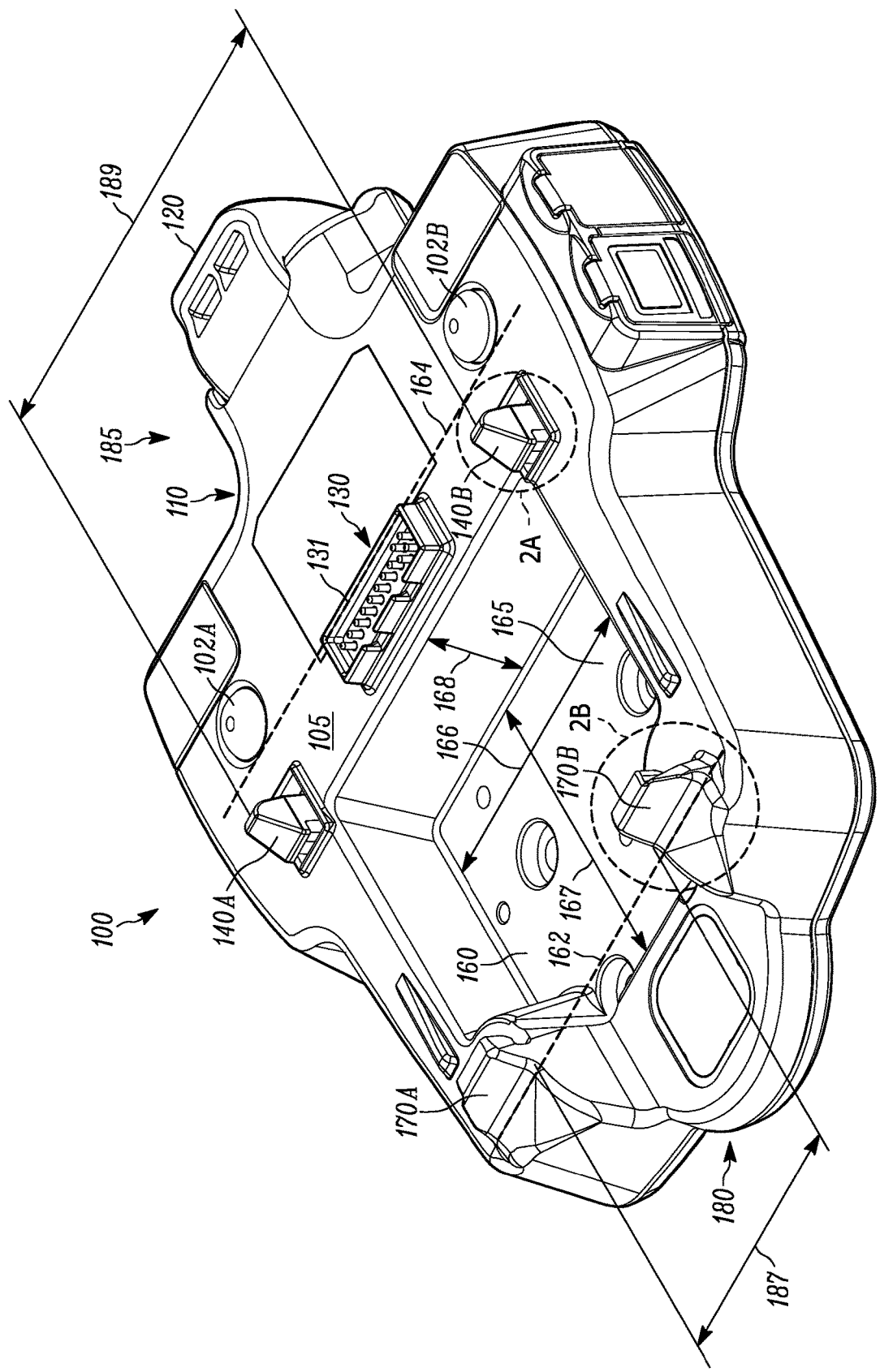
FIG. 1A illustrates a top perspective view of an exemplary cradle structured in accordance with certain embodiments.

Various embodiments of the present invention now will be described more fully hereinafter with reference to the accompanying drawings, in which some, but not all embodiments of the inventions are shown. It should be appreciated that the size and thickness of components shown in the accompanying drawings may differ from the physical size and physical thickness of the components and that the thickness of some portions are drawn on an enlarged scale for better comprehension and ease of description. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments of the present invention are directed to an improved docking, charging, and networking device for a mobile printer. This improved device or cradle is structured to provide secure four point attachment of the corresponding mobile printer. The cradle is further structured to define adequate clearance for a mobile printer that is configured to accept an extended battery pack. Additionally, the cradle is configured to provide for a simplified single hand release of the mobile printer.

The cradle is configured to charge the mobile printer and otherwise dispose the printer in electronic communication with various network servers and accessory devices. In some embodiments, the cradle is advantageously configured such that various wired connections, e.g., power cord, USB accessory device, USB slave device, Ethernet cord, etc., may be plugged into the cradle and further configured to pass electrical communications originating with such connections through to a docked mobile printer. This allows the cradle, rather than the printer, to provide the base for such wired connections leaving the printer free to be quickly docked and un-docked without the need to repeatedly plug and unplug such wired connections.

Embodiments of the present invention are illustrated in the appended figures and description below. As will be apparent to one of ordinary skill in the art in view of this disclosure, the inventive concepts herein described may be applied to various applications.

Example Cradle Apparatus

A "cradle," as used herein, refers to an apparatus that can receive and electrically couple with a printing device (e.g., a mobile printer), function as a source of power to charge the printing device's batteries, and facilitate data and electrical communications between the printing device and an external device (e.g., network server, accessory devices, etc.). Cradles, such as cradle 100 illustrated in FIGS. 1A and 1B, 2A-2C, 4, 5A-5D, 6A-6B, and 7A-7B may be configured to support a printing device, such as printing device 300 described in connection with FIGS. 3A, 3C below.

FIGS. 1A and 1B and 2A-2C show various views of cradle 100. Cradle 100 may include cradle body 110 that defines capture end 180 and release end 185. As depicted, cradle body 110 is comprised of a plastic material. In preferred embodiments, cradle body 110 is comprised of a plastic (e.g., polycarbonate plastic). In some embodiments, cradle body 110 may be made from any suitable material and/or combinations of materials. For example, cradle body 110 may be made from plastic(s), rubber, metal, composite material, any other type of material, or combination thereof. In particular, cradle body 110 may be made from acrylonitrile butadiene styrene (ABS), die cast zinc alloy, or other suitable resins. In further embodiments, a thermoplastic elastomer configured to resist at least one of oil, abrasion, or drops, in some example embodiments, may overlay cradle body 110.

As depicted, cradle body 110 is structured to be durable enough to protect the internal components from a drop, while still allowing signals, for example, wireless signals, such as those used to wirelessly communicate with a docked mobile printer to radiate through at least some locations of cradle body 110.

The depicted cradle body 110 is configured to define extended battery cavity 160. Extended battery cavity 160 may include first side 162 (illustrated by dashed line 162), second side 164 (illustrated by dashed line 164), and recess surface 165 as illustrated in FIG. 1A. In some embodiments, extended battery cavity 160 is sized to provide adequate clearance for receiving at least part of extended battery when a mobile printer equipped with an extended battery is docked into cradle 100. In some embodiments, recess surface 165 is recessed at least 16.5 mm from mount surface 105 to ensure adequate clearance for extended battery equipped mobile printers. In particular, the proximate dimensions of extended battery cavity 160 measure 47.8 mm in length 167, 72.5 mm in width 166, and 16.5 mm in height 168 to adequately receive extended battery equipped printing devices. In other embodiments, the proximate dimensions of extended battery cavity 160 may be between 45-50 mm in length 167, between 70-74 mm in width 166, and between 16-17 mm in height 168.

The depicted cradle 100 further defines a four point printer attachment structure. In the depicted embodiment, such attachment structure includes first and second printer capture flanges 170A and 170B shown in FIGS. 1A and 1B, 2A, and 4 that are structured to engage reciprocally defined cavities of printing device 300 (shown in FIG. 3A). In the depicted embodiment, first and second printer capture flanges 170A and 170B extend from mount surface 105 of cradle body 110. As used herein, a "flange" may refer to a projecting rim or edge for fastening, stiffening and/or positioning.

As used herein, the term "extending" may refer to one or more elements or components which have been molded, attached, coupled, welded, affixed, protruded, lengthened, or otherwise affixed to another component. For example, the first and second printer capture flanges are structured to extend (e.g., molded into, welded to, etc.) from the cradle body. The term extending also refers to a process or method step for affixing, coupling, molding, attaching, welding, protruding, or lengthening one component to another.

The depicted first and second printer capture flanges 170A and 170B are disposed proximate a first side 162 of extended battery cavity 160. The first and second printer capture flanges 170A and 170B are further configured to extend from cradle body 110 proximate capture end 180. Other features and aspects of the depicted printer capture flanges 170A and 170B are discussed in connection with FIG. 2B described herein below.

Figure 3A:
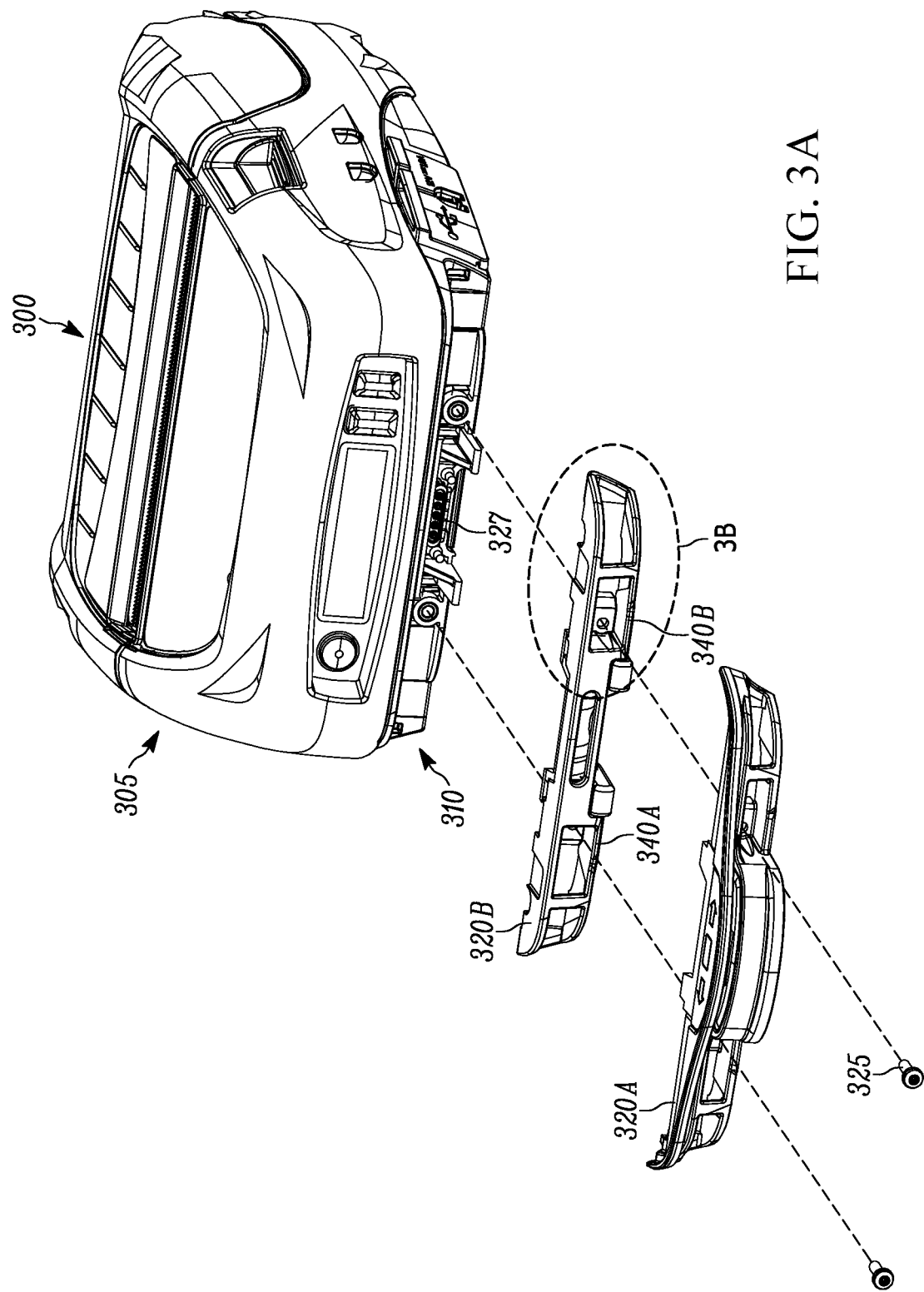
FIG. 3A illustrates a front perspective view of an exemplary printing device structured in accordance with various embodiments.
Figure 3B:
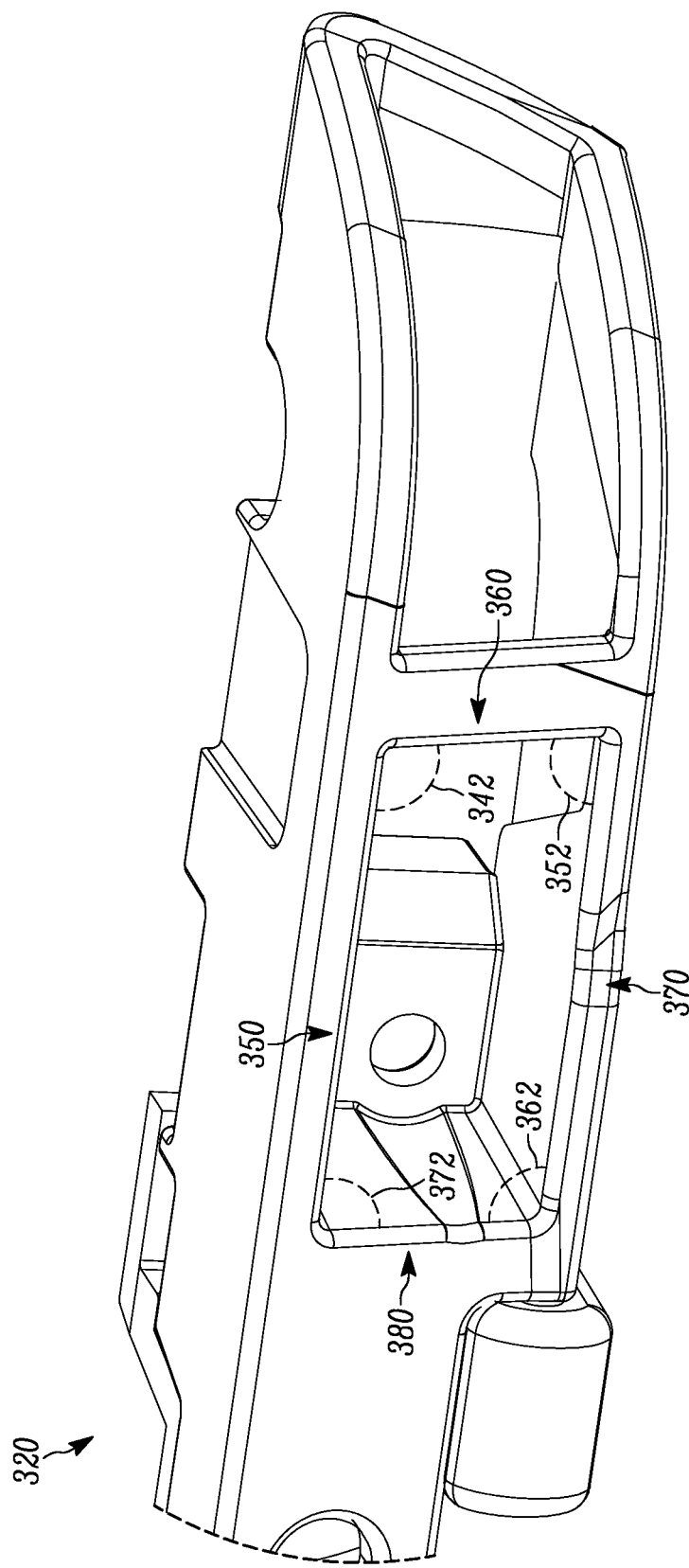
FIG. 3B illustrates a detail view of a bumper attachment for the printing device of FIG. 3A.
Figure 3C:
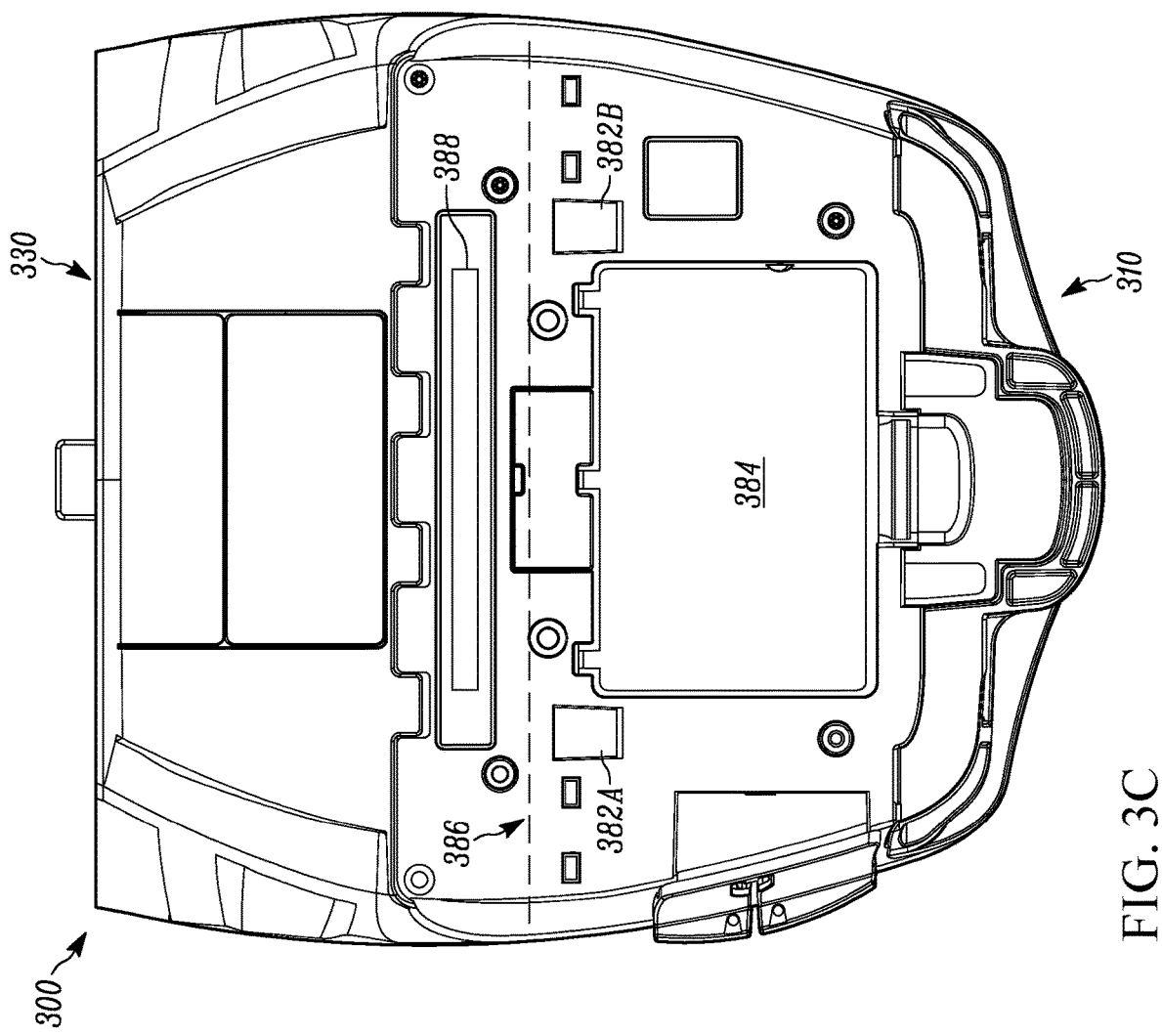
FIG. 3C illustrates a bottom view of an exemplary printing device structured in accordance with various embodiments.
Figure 3D:
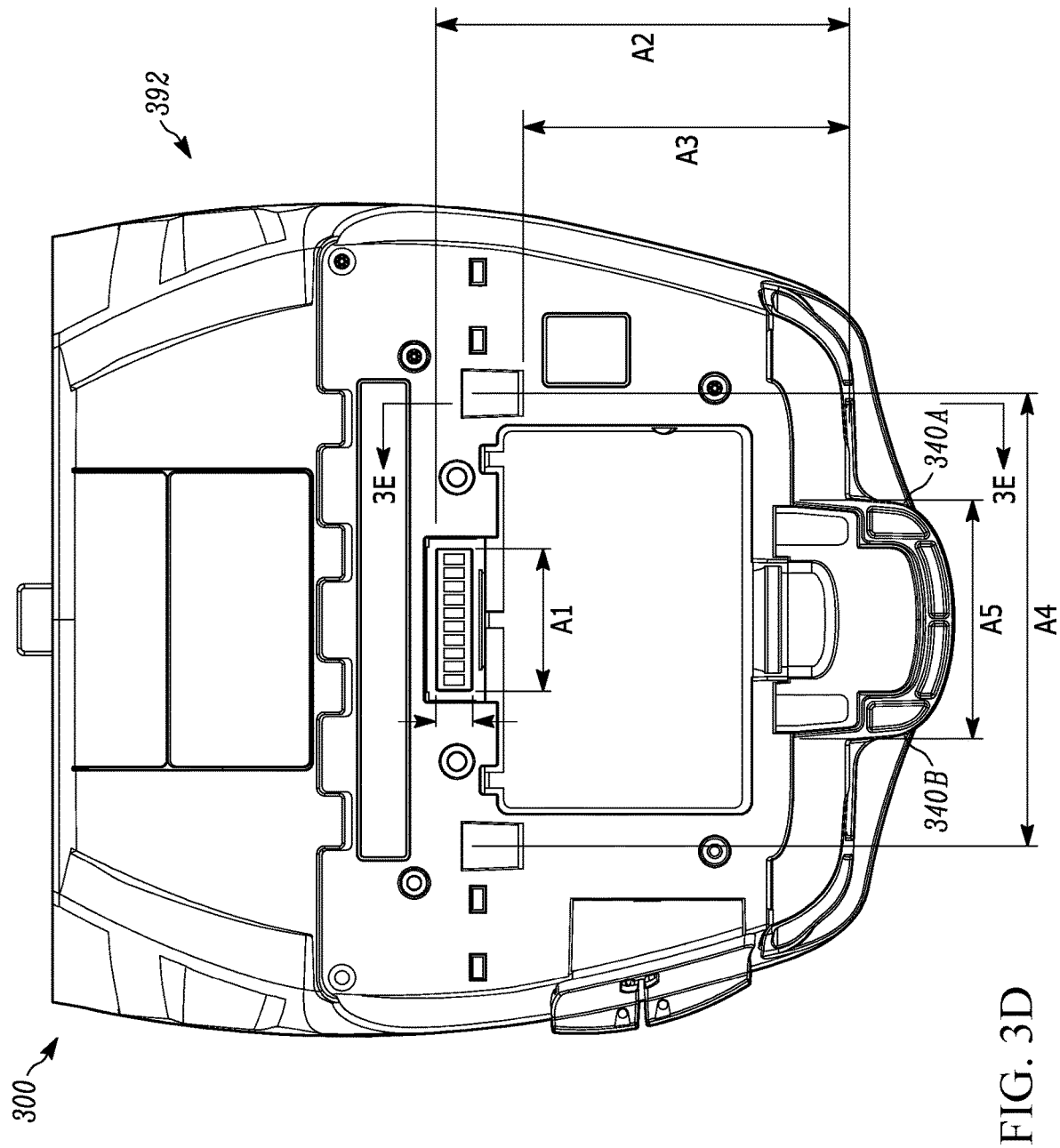
FIG. 3D illustrates a bottom view of an exemplary printing device structured in accordance with various embodiments.
Figure 3E:
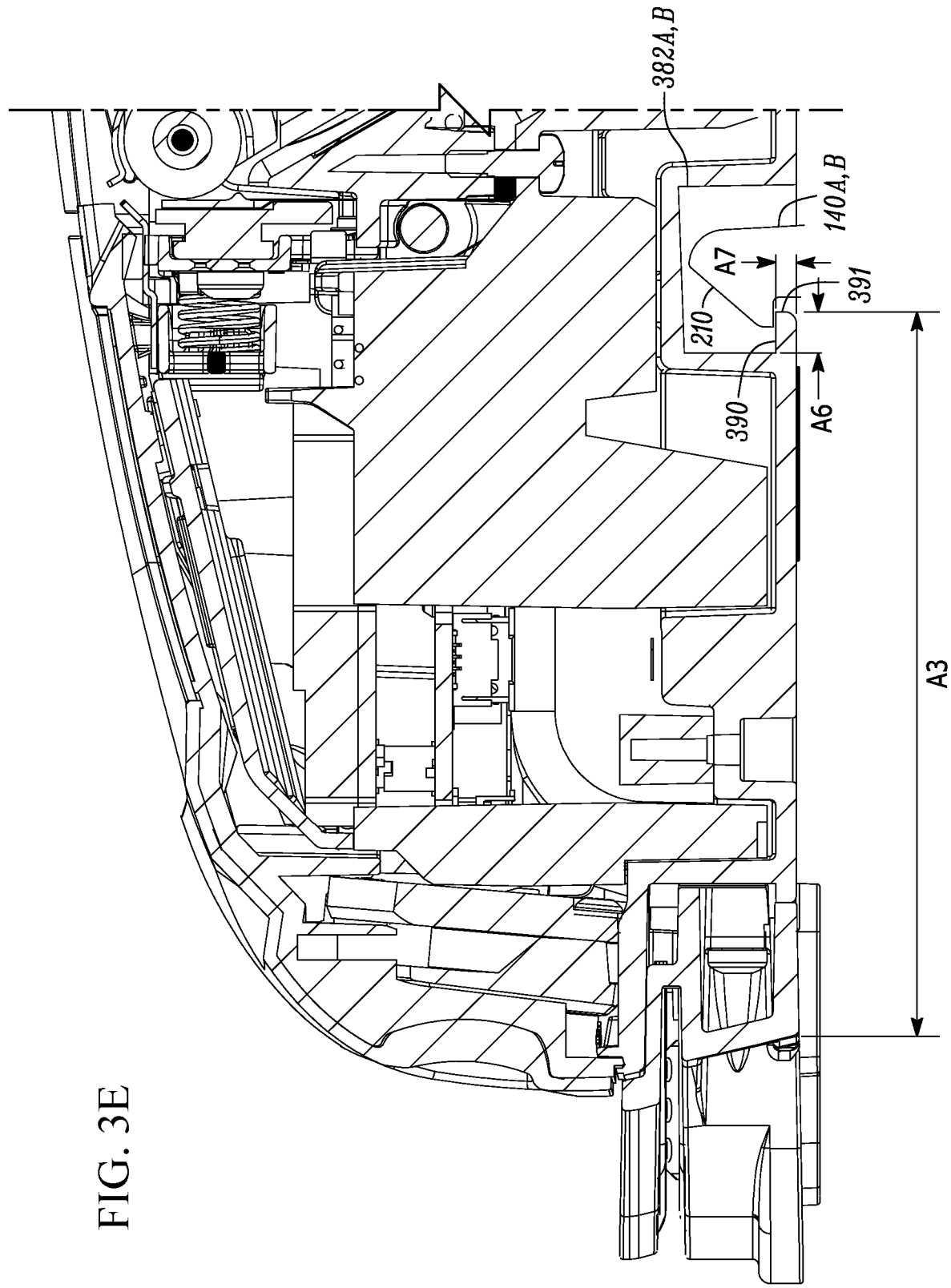
FIG. 3E illustrates a side view of an exemplary printing device structured in accordance with various embodiments.

In one embodiment, the four point printer attachment structure also includes first and second biased latches 140A and 140B that are configured to engage and secure reciprocally defined cavities in printer device 300 (as shown in FIGS. 3C and 3E at 382A-B).

As shown in FIG. 1A, the depicted first and second biased latches 140A and 140B are configured to extend from cradle body 110 and/or be disposed proximate a second side 164 of extended battery cavity 160. In other embodiments, first and second biased latches 140A and 140B may be configured to extend from cradle body 110 between capture end 180 and release end 185. As such, in some preferred embodiments, cradle 100 is configured for four-point attachment that includes first and second printer capture flanges 170A and 170B and first and the second biased latches 140A and 140B. For example, the printing device (e.g., printing device 300) is securely attached to cradle 100 upon the mating of first and the second printer capture flanges 170A and 170B and first and second biased latches 140A and 140B with the reciprocally defined cavities of printing device 300 as described herein with respect to FIG. 4. Further example embodiments including biased latches are discussed in connection with FIG. 2B described herein below.

Cradle 100 also includes communication port 130 configured to receive communication connector 388 (e.g., as illustrated in FIG. 3C) of a printing device and thereby facilitate electrical communication between the cradle and the printing device. Communication port 130 is disposed within communication flange 131 which is structured define a tapered perimeter wall as shown. The communication flange 131 combines with the first and second printer capture flanges 170A and 170B and the first and second biased latches 140A and 140B to precisely locate the printing device relative to the cradle 100 as the printing device is docked onto the cradle 100. In some embodiments, communication flange 131 provides rearward support to a docked printing device in that it limits the printing device from sliding towards release end 185 of the cradle 100.

In some embodiments, communication port 130 is configured to enable data, power, ground and other types of signals to be provided to, for example, a printer's electrical interface components. Data imported may include printing commands, status requests, e-mail, printer settings, executable computer code, definitions for formatting data, fonts, graphics, passwords, or maintenance data. The data may be provided from a data storage medium, such as a computer, web site, portable data terminal, mobile phone, bar code reader, RFID reader, weigh scale, truck radio, or even another printer. Communication could be via a Universal Serial Bus (USB) as described herein below with reference to FIGS. 7A and 7B, Ethernet stack, wireless radio, or the like. Data may also be exported from communication port 130 to help with product information storing and shipment tracking. Data exported may include the response to status requests, e-mail, network messages, printer status or settings, stored customer data, passwords, maintenance data, printer alert conditions, information read from RFID tags on the ribbon or supplies, battery status, external battery conditions, or information derived from sensors within the printer such as power conditions, supply measurements, temperature, or print head conditions.

The depicted communication port 130 includes 12 individual communication contacts. The individual communication contacts of communication port 130 are arranged as shown in FIG. 1A. In some example embodiments, communication port 130 may include 10 to 19 individual communication contacts or pins. It should be appreciated that each of the individual communication contacts may be electrically isolated from the others. In further embodiments, first and second biased latches 140A and 140B and/or first and second printer capture flanges 170A and 170B comprise male connector components configured to guide and removably lock a printing device (such as, e.g., printer device 300) into a docked position, such that the printing device's electrical interface (such as, e.g., the printing device's communication connector 388) makes sufficient contact with communication port 130.

Cradle 100 may also be configured to connect to one or more power sources (e.g., analog to digital converter, mains power, battery, etc.). Furthermore, cradle 100 may also be configured to connect to one or more wired networks (e.g., the Internet, intranet, etc.) and/or any other devices via one or more additional cables and/or components. Various embodiments of cradle 100 may also utilize wired and/or wireless communications techniques and/or protocols for communications with, and control of, cradle 100 via communication port 130 as described herein. These communications techniques and/or protocols may allow for tethered and/or untethered operation of cradle 100.

In some embodiments, cradle 100 may include a communications interface that may be controlled by various means, including one or more processors. The one or more processors may be software and/or hardware configured and may control various communications hardware that may be used to implement communications with a remote device (e.g., an external device). The processor(s) may be configured to communicate using various wired and wireless communications techniques and/or protocols including serial and parallel communications and printing protocols, USB techniques, transmission control protocol/internet protocol (TCP/IP), radio frequency (RF), infrared (IrDA), or any of a number of different wireless networking techniques, including WLAN techniques such as, IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, Bluetooth (BT), ultra wideband (UWB), Near field communication (NFC), inductive electrical power transfer such as Qi, and/or the like. The cradle 100 may implement these and other communications techniques and/or protocols directly with an external device in a point-to-point manner, or indirectly through an intermediate device such as an access point or other network entity. Various external devices that may be used to communicate with and/or control the operation of cradle 100 may include computers, mobile computers, cameras, scales, global positioning system (GPS) devices, radios, mobile terminals, media players, or the like.

In the depicted embodiment, communication port 130 extends from cradle body 110 proximate second side 164 of the extended battery cavity 160. For example, communication port 130 may be disposed between first and second biased latches 140A and 140B as illustrated in FIG. 1A. In some embodiments, communication port 130 may be located under a data port cover and may allow for data to be input to communicate with the printing device (e.g., printing device 300) during typical operation to help facilitate tasks like storing information or printing certain labels.

Figure 2B:
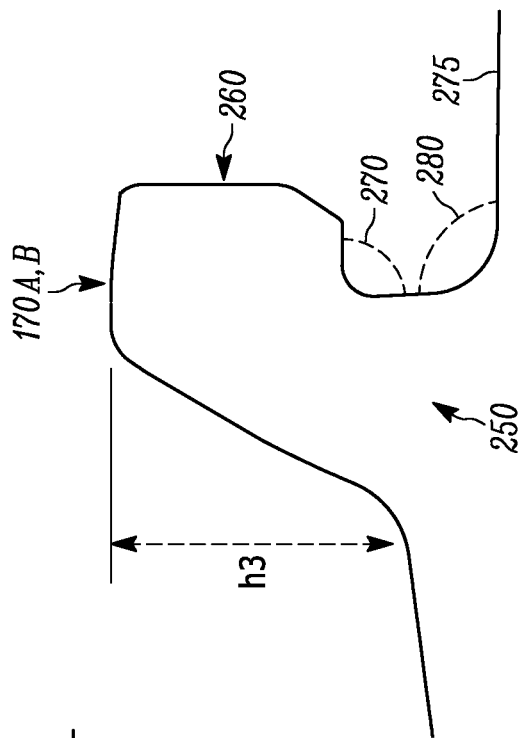
FIG. 2B illustrates a detail side view of a flange structured in accordance with one embodiment, taken along detail circle 2B of FIG. 1A.
Figure 2A:
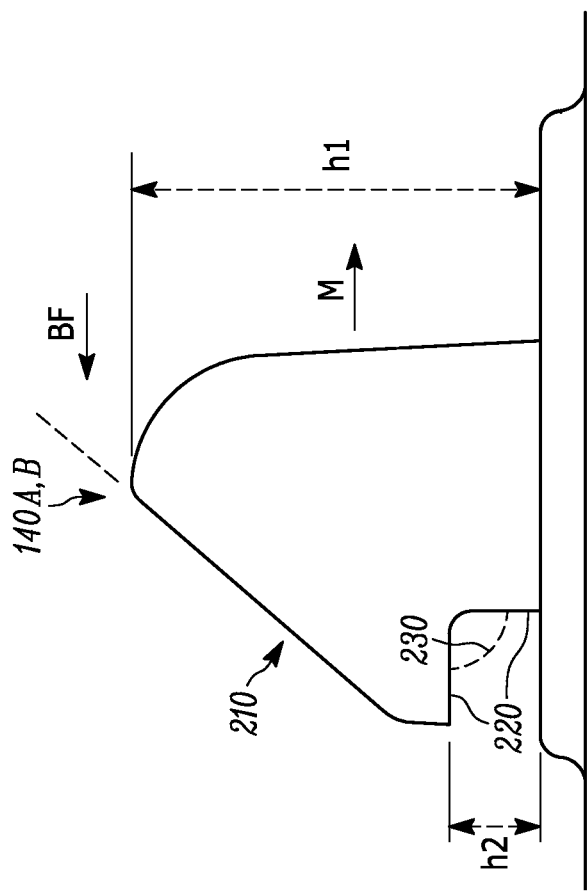
FIG. 2A illustrates a detail side view of a latch structured in accordance with one embodiment, taken along detail circle 2A of FIG. 1A.

FIG. 2A illustrates a detail view of first and second biased latches 140A and 140B. Each of first and second biased latches are moveable from a locked position (shown in FIG. 2A) to an unlocked position (not shown) against a biasing force BF. In preferred embodiments, 7.5 lbs. is the biasing force BF required to ensure adequate mounting and attachment of the printer to the cradle. In other embodiments, the biasing force may be between 5 and 10 lbs.

In the depicted embodiment, first and second biased latches 140A and 140B are configured to measure 9.5 mm (millimeters), a latch height h1. The latch height h1 may range between 5 mm to 15 mm. In the depicted embodiment, first biased latch 140A is disposed at a latch center distance 189 (shown in FIG. 1A) with respect to second biased latch 140B. For example, first biased latch 140A is disposed at a latch center distance of 86 mm center to center with respect to second biased latch 140B.

As illustrated in FIG. 2A, each of first and second biased latches 140A and 140B define printer drive surface 210 and lock surface 220. Printer drive surface 210 may be configured for engagement by the underbody surface of printer 300 (immediately proximate first recess 382A and second recess 382B) such that downward movement of the printer 300 (shown in FIG. 4) drives the first and second biased latches 140A and 140B along arrow M against their respective biasing forces BF from the locked position (shown in FIG. 2A) toward an unlocked position.

In some embodiments, lock surface 220 and printer drive surface 210 define locking angle 230. In a preferred example embodiment, lock surface 220 and printer drive surface 210 define a 90 degree locking angle 230 that is configured to provide strength, clearance, and security for holding the printing device in place. In some embodiments, locking angle 230 may be an angle measured in the range between 60 and 95 degrees. First and second biased latches 140A and 140B are configured to move from an unlocked position to a locked position when they snap into engagement with components of the printing device as described below with reference to FIGS. 3A and 4.

In the depicted embodiment, first and second biased latches 140A and 140B are configured to click-back in response to mating of locking angle 230 and lock surface 220 with female connecting components (e.g., first recess 382A and second recess 382B defined by cradle engagement surface 330 of printing device 300). In further embodiments, first and second biased latches 140A and 140B are configured to provide a spring-biased attachment of a cradle body to a printing device. However, in other embodiments, first and second biased latches 140A and 140B may be configured to provide a spring-biased, damper-biased, or similar attachment of a cradle body to a printing device. In the depicted embodiment, the spring is retracted and/or expanded in response to a force (e.g., biased force BF and/or moving force applied by the downward moving printer along arrow M) being applied to the spring. The force applied to the spring locks first and second biased latches 140A and 140B, and thereby, securely attaches printer device 300 to cradle 100. In preferred embodiments, the spring takes the form of a compression spring comprising spring steel. Alternatively, the spring may take the form of a tension spring, extension spring, compression spring, torsion spring, constant spring, variable spring, machined spring, flat spring, coil spring, belleville spring, main spring, spring washer, and/or the like.

Returning to FIG. 1A, cradle 100 also includes compression dampers 102A and 102B that are configured to balance force and vibration that may result as cradle 100 and printing device 300 are engaged (e.g., the printing device is attached to the cradle) and/or disengaged (e.g., the printing device is released from the cradle). In the depicted embodiment, compression dampers 102A and 102B are rubber bumpers. Alternatively, compression dampers 102A and 102B may take the form of a pad or one or more springs. In a locked position (as referenced in FIG. 4), compression dampers 102A and 102B aid in keeping the printing device securely attached to cradle 100. In such embodiments, compression dampers 102A and 102B absorb gaps and vibrations as first and second biased latches 140A and 140B mate with female connecting components (e.g., first recess 382A and second recess 382B) defined by the cradle engagement surface 330 of the printing device. When biased release member 120 is depressed (as illustrated with reference to FIGS. 6A and 6B), compression dampers 102A and 102B move from a damper rest position to an active damper position (e.g., compression dampers 102A and 102B extend or pop-up), thereby, creating a gap that assists in disengaging (e.g., lifting) printing device 300 from cradle 100. Although two compression dampers 102A and 102B are depicted, it should be appreciated that a single or three or more compression dampers may be utilized in some embodiments.

Figure 4:
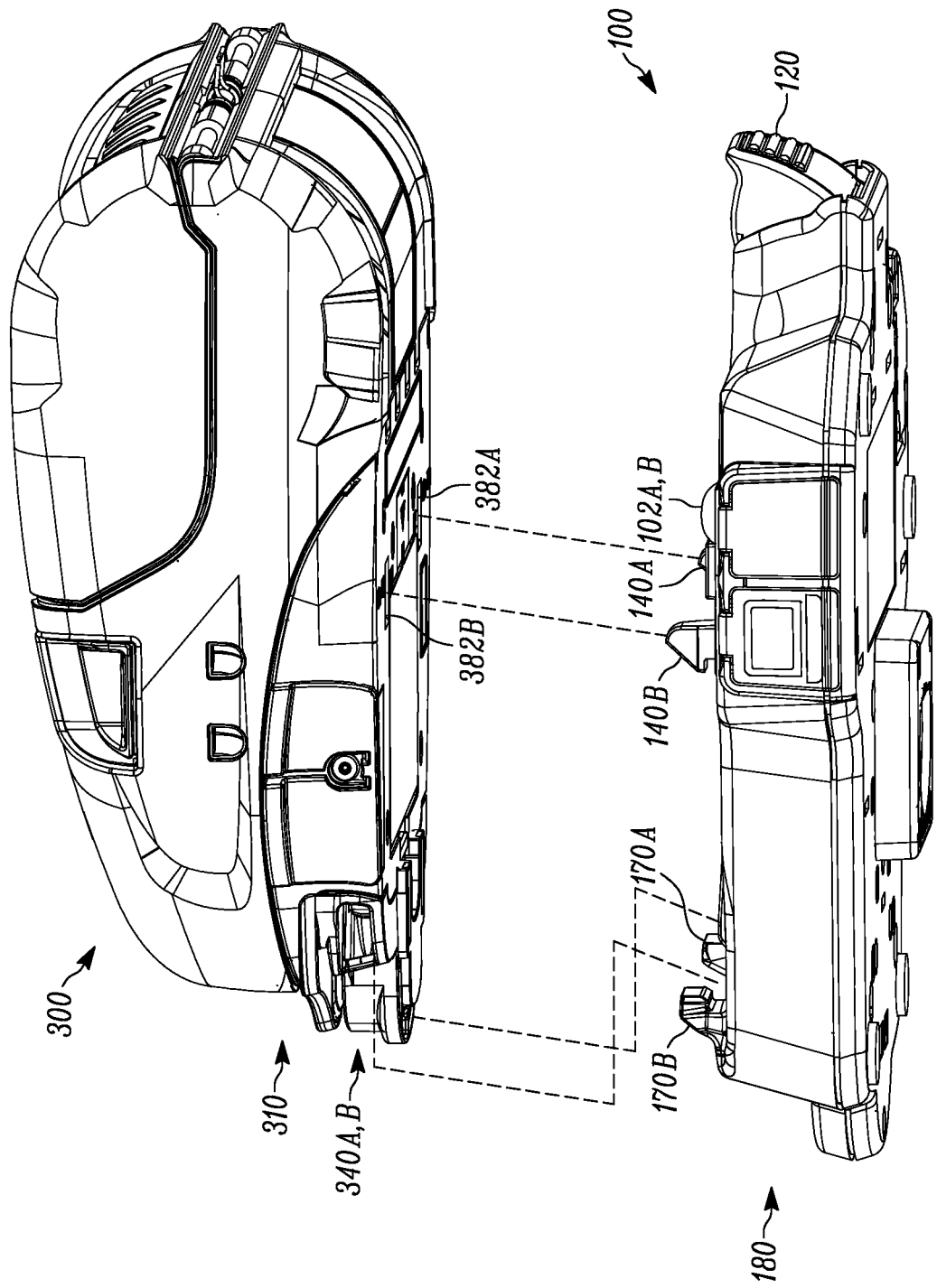
FIG. 4 illustrates a side perspective view of an exemplary cradle and printing device structured in accordance with various embodiments.

FIG. 2B illustrates an example view of first and second printer capture flanges 170A and 170B that define support portion 250 and capture portion 260. As illustrated, capture portion 260 extends from support portion 250. Support portion 250 and capture portion 260 define capture angle 270. In depicted example embodiment, support portion 250 and capture portion 260 define a 90 degree capture angle. In some embodiments, capture angle 270 may be an angle configured to measure between 0 and 180 degrees. Further, support portion 250 and first side portion 275 define supporting angle 280. To that end, first and second printer capture flanges 170A and 170B are configured to be received into capture cavities 340 defined by bumper attachment 320A and 320B of, for example, printing device 300 as the printing device 300 is docketed into the cradle 100 as shown in FIG. 4.

Returning to FIG. 2B, first and the second printer capture flanges 170A and 170B are configured to measure a flange height h3 measuring 6.5 mm. The flange height h3 may range from a minimum of 1 mm to a maximum of 30 mm. In the depicted embodiment, first printer capture flange 170A is disposed at a flange locating distance 187 with respect to second printer capture flange 170B. For example, first printer capture flange 170A is disposed at a flange locating distance of 47.5 mm from inner edge to inner edge with respect to second printer capture flange 170B.

In the depicted embodiment, first and second printer capture flanges 170A and 170B are comprised of a plastic (e.g., polycarbonate plastic). In other embodiments, first and second printer capture flanges 170A and 170B may be made from plastic(s), rubber, metal, composite material, any other type of material, or combination thereof. Alternatively, or additionally, first and second printer capture flanges 170A and 170B may be made of the same material as cradle body 110, a material other than the material of cradle body 110, or a combination thereof. First and second printer capture flanges 170A and 170B may be strong enough to resist fracture in response to the attachment and detachment of printing device 300, for example, from cradle 100.

Figure 2C:
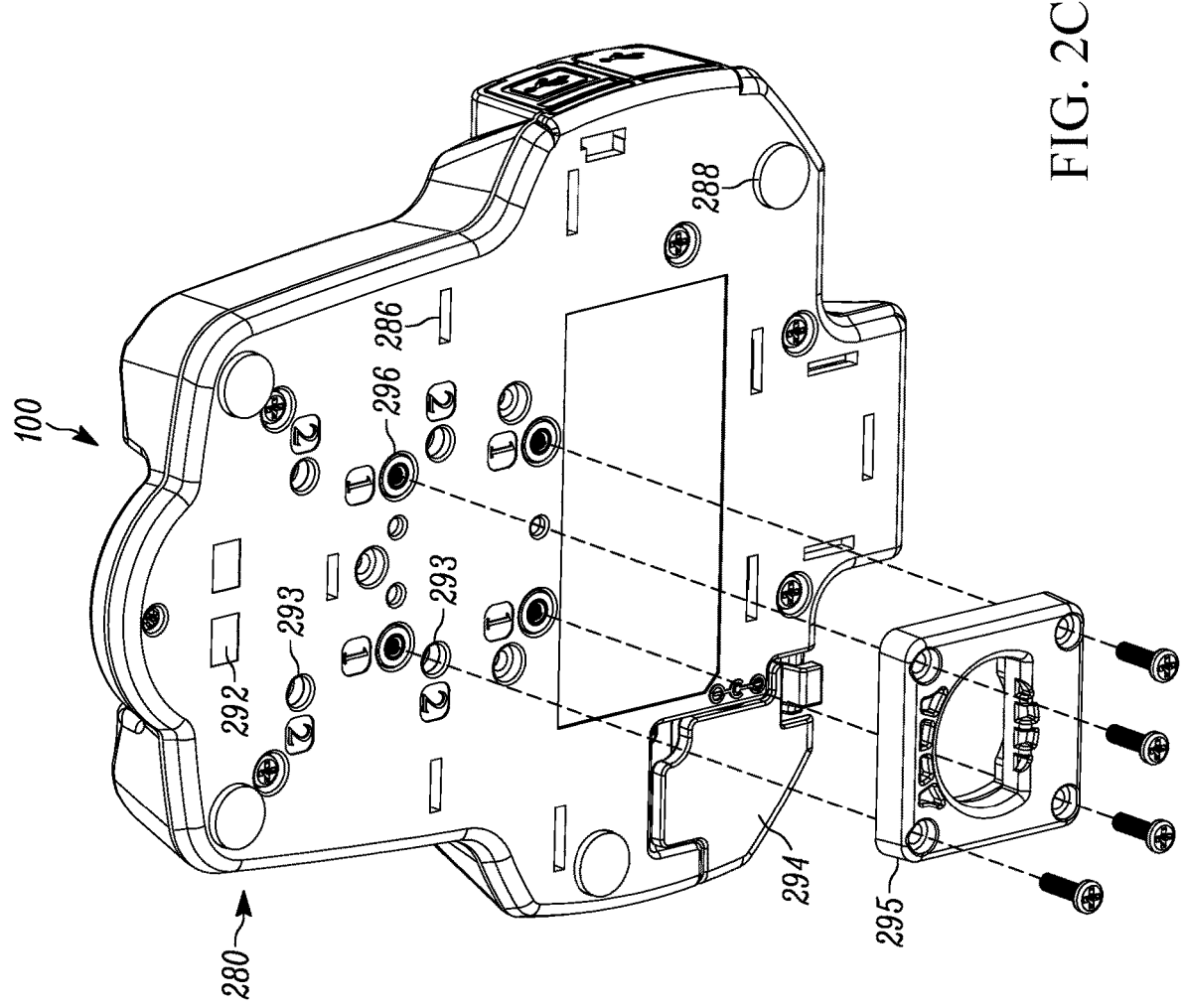
FIG. 2C illustrates a bottom perspective view of a cradle structured in accordance with various embodiments.

FIG. 2C illustrates an example bottom perspective view of cradle 100. Cradle 100 includes bottom surface 280. Bottom surface 280 includes electrical connections 292 (e.g., pad connectors, etc.) that are configured to interface with one or more charging devices. In the depicted embodiment, cradle 100 also includes mount interface 293 defined by bottom surface 280. In various embodiments, cradle 100 may be coupled to one or more mounts, such as a standard RAM (Round-A-Mount) mount or other like mounts, configured to connect to mount interface 293 or a D-shaped lock mount adapted to connect to D-shaped lock interface 295 which in turn connects to threaded mount receivers 296.

In one embodiment, cradle 100 may receive electrical current when charging the printing device. Cradle 100 may receive electrical power through direct current (DC) member 294 (illustrated in FIG. 1B). Still in other embodiments, cradle 100 may interface (e.g., be connected to and operate in parallel with) with external devices, for example, a barcode scanner, power source, accessory device, network device, and/or other apparatus. Advantageously, such connections may facilitate the convenience of utilizing the capabilities of such external devices in parallel without having to unplug each cable associated with the aforementioned external devices when the printing device is docked or undocked to the cradle.

In further embodiments, cradle 100 is configured to meet IEC 60529, an international protection (IP) code. The IP code rates the degree of protection cradle 100 provides against intrusion (e.g., intrusion from body parts such as hands and fingers), dust, accidental contact, and water by mechanical casings (e.g., cradle body 110) and electrical enclosures. In the depicted embodiment, cradle 100 is configured to meet the IP43 standard. To that end, bottom surface 280 defines one or more drains 286 configured to protect internal components of cradle 100 from intrusion by water and foreign bodies.

Additionally, bottom surface 280 comprises one or more pads or protrusions 288 (e.g., feet) configured for mounting cradle 100 on a support surface such as, for example, a table, desk, dashboard, wall, or any other like surface comprising a flat top and/or configured to provide a level surface on which one or more objects may be placed. The one or more protrusions 288 may be made of plastic(s), rubber, metal, composite material, any other type of material, or combination thereof.

Example Printing Device

Printing devices may be configured to perform a variety of operations, such as printing labels, receipts, barcodes, cards, media, and other materials, connecting to a network via wired or wireless technologies, reading, writing, and/or processing barcode or radio frequency transponders or tags. Each of these example activities negatively impact (i.e., drains) the battery power of the printing device. To that end, printing devices periodically need to be charged and/or stored. Printing devices, such as printing device 300 illustrated in FIGS. 3A-3E, 4, and 7, are configured to dock with a cradle (e.g., cradle 100) for storage (e.g., storage of the printing device), wired or wireless communication (e.g., charging the battery of the printing device, providing network communications, etc.), and/or other like uses.

FIGS. 3A-3C, 4, and 7 illustrate various views of printing device 300. With reference to FIG. 3A, printing device 300 may include printer body 305. In preferred embodiments, printer body 305 comprises an injection molded thermoplastic and/or a polycarbonate plastic (e.g., LEXAN EXL). In other embodiments, printer body 305 may be made from any suitable material and/or combinations of materials. For example, printer body 305 may be made from plastic, rubber, metal, composite material, any other type of material, or combination thereof. In the depicted embodiment, printer body 305 is strong enough to protect the internal components from a fall, detachment or ejectment, while still allowing wireless signals, such as those used to communicate with other devices to radiate through in at least some locations. In some embodiments, printer body 305 may include integrated components (e.g., display screens, navigation button arrangements, etc.) that may be suited to be formed from one or more materials other than materials forming portions of the printer body.

The depicted printing device 300 is configured to receive either of alternative bumper attachments 320A and 320B. As will be apparent to one of ordinary skill in the art, bumper attachment 320A is configured with a magnetic card reader. Alternatively, bumper attachment 320B is not configured with a magnetic card reader. Bumper attachments 320A and 320B are each configured to extend from printer body 305. In the depicted embodiment, bumper attachments 320A and 320B are disposed proximate a front side 310 of printing device 300. Bumper attachment 320A is formed from an alloy comprising zinc and alloying elements including aluminum, magnesium, and copper (e.g., zamak). Bumper attachment 320B is formed from a polycarbonate plastic. Alternatively in other embodiments, bumper attachments 320A and 320B may be formed from the same material(s) as that of printer body 305 or bumper attachment 320A and 320B may be formed from one or more different materials other than the material(s) forming printer body 305.

As illustrated, bumper attachment 320A is configured to electronically connect its magnetic card reader to printing device 300 via attachment communication interface 327. Here, attachment communication interface 327 comprises a pogo pin connector configured to utilize serial communication. Attachment communication interface 327 provides electrical connections to accommodate features such as the above referenced magnetic card reader, a smart card reader, a scanner, fiscal management device(s), and/or other like features. In some embodiments, the pogo pin connector may be configured to connect to one or more printed circuit boards (PCBs). In some example embodiments, the PCB may electrically connect electronic components using conductive tracks, pads, and other features. Such features may be formed from metal sheets, preferably copper sheets, bonded with a non-conductive substrate. In further embodiments, PCB may include a plurality of layers (e.g., one copper layer, two copper layers, etc.), capacitors, resistors or active devices, embedded in the substrate.

When attaching (e.g., securing) bumper attachment 320A and 320B to printing device 300, one or more fasteners 325 are utilized as depicted in FIG. 3A. Here, one or more fasteners 325 take the form of one or more screws. One or more fasteners 325 may take the form of one or more screws, nails, pins, threaded inserts, flanges (e.g., male and female components configured to mate by snapping together) and/or any other type of mechanical fasteners. For example, screws 325 attach bumper attachments 320A and 320B to printing device 300. To that end, bumper attachments 320A and 320B are configured to remain securely attached to printing device 300 in response to attachment of printing device 300 to cradle 100. For example, printing device 300 is attached to cradle 100 as described herein with reference to FIG. 4. Additionally, bumper attachments 320A and 320B are configured to remain securely attached to printing device 300 in response to detachment of printing device 300 from cradle 100. For example, printing device 300 is released from cradle 100 as described herein with reference to FIGS. 6A and 6B.

In some embodiments, bumper attachments 320A and 320B define a plurality of capture cavities 340A and 340B configured to interface with cradle 100 as described herein below with reference to FIGS. 3B and 4.

Printing device 300 also includes cradle engagement surface 330 as illustrated in FIG. 3C (i.e., an example bottom view of printing device 300) configured to interface with a cradle (e.g., cradle 100). Cradle engagement surface 330 is configured to define female interface components, such as first recess 382A and second recess 382B. First recess 382A and second recess 382B are disposed proximate connector side 386 (shown by dashed line 386) of battery receptacle 384.

In example embodiments, first recess 382A and second recess 382B are configured to receive male components, such as first and second biased latches 140A and 140B. Turning to FIG. 3E, first recess 382A and second recess 382B include first and second recess walls 390, 391 that are configured to interface with locking angle 230 and lock surface 220 of first and second biased latches 140A and 140B. Said differently, in the depicted embodiment, the barb type head (i.e., the drive surface 210 and lock surface 220) defined by the first and second biased latches 140A and 140B is configured to snap into the first and second recesses 382A, 382B such that the bottom wall of the cradle engagement surface 330 proximate the recesses (e.g., the shelf defined by first and second recess walls 390, 391) is captured into the cavities defined by the respective lock surfaces of the first and second biased latches 140A and 140B. In the depicted embodiment, recess wall 391 defines a height A7 of 1.75 mm. The depicted recess wall 390 defines a length A6 of 3.502 mm. In other embodiments, A7 may range between 1 and 2 mm while A6 may range between 3 and 4 mm.

FIG. 3B illustrates a detail view of bumper attachments 320A and 320B. The depicted bumper attachment 320A and 320B defines two capture cavities 340A and 340B that are structured and positioned to slidably receive capture flanges 170A, 170B of the cradle 100. The two capture cavities 340A and 340B are defined by respective left bumper cavity side 380, right bumper cavity side 360, top bumper cavity side 350, and bottom bumper cavity side 370. Top bumper cavity side 350 and right bumper cavity side 360 are configured to define first angle 342. Right bumper cavity side 360 and bottom bumper cavity side 370 are configured to define second angle 352. Bottom bumper cavity side 370 and left bumper cavity side 380 are configured to define third angle 362. Left bumper cavity side 380 and top bumper cavity side 350 are configured to define fourth angle 372. As depicted in FIG. 3B, first angle 342, second angle 352, third angle 362, and fourth angle 372 each measure approximately 90 degrees and are structured to slideably receive capture flanges 170A, 170B. While depicted as defining a generally rectangular shape, one or ordinary skill in the art may readily appreciate that capture cavities 340A and 340B may define a variety of other shapes (e.g., square, hexagonal, round, semi-circular, triangular, etc.) so long as capture flanges 170A, 170B are reciprocally structured to promote slideable engagement between the capture flanges and the capture cavities.

Example Cradle-Printer Interface

FIG. 4 illustrates an example view of a cradle (e.g., cradle 100) interfacing with a printing device (e.g., printing device 300). As printing device storage needs and/or communication needs (e.g., printing device 300 is low on power) arise a user may attach or dock the printing device into the cradle.

When a user wants to attach printing device 300, for example, to cradle 100, the user tilts front side 310 of printing device 300 into capture end 450 of cradle 100. It should be appreciated that the cradle (e.g., cradle 100) is configured to receive a printer 300 simply and efficiently with a user driving the printer 300 into a docked position using a single hand. As front side 310 of printer 300 is tilted to interface with cradle 100, first and second printer capture flanges 170A and 170B are configured to move into and be slidably received by correspondingly positioned capture cavities 340A and 340B (shown in FIGS. 3A-3B) of bumper attachment 320A and 320B.

Once the capture flanges 170A and 170B are sufficiently seated into the capture cavities 340A and 340B, the user drives the cradle engagement surface 330 of the printer 300 downwardly toward the cradle 100. Portions of the cradle engagement surface 330 disposed proximate the first recess 382A and second recess 382B (i.e., the forward edges of the recesses) are thereby driven downwardly into printer drive surfaces 210 of the first and second biased latches 140A and 140B. The first and second biased latches 140A and 140B are thus driven rearward, along arrow M against the bias force BF shown in FIG. 2A, until the barbed ends of the first and second biased latches 140A and 140B fully seat into corresponding first and second recesses 382A, 382B defined by cradle engagement surface 330.

In the depicted embodiment, first and second biased latches 140A and 140B are configured to click-back (i.e., move slightly forward along bias force direction BF) when fully seated such that lock surface 220 receives the respective recess walls 390, 391 (as illustrated in FIG. 3E) of the first recess 382A and the second recess 382B.

As shown in FIG. 3D, first recess 382A is disposed at a recess center distance A4 of approximately 86 mm center to center with respect to second recess 382B. This recess center distance is structured to correspond generally with the center to center distance between the first and second biased latches 140A and 140B of cradle 100 that also measures proximately 86 mm center to center. Additional measurements structured to ensure proper alignment also include the latch recess leading edge distance A3 (as depicted in FIGS. 3D and 3E) from a leading edge of the printing device to a leading edge (i.e., where recess wall 391 meets the cradle engagement surface of the printing device) of the first and second recesses 382A and 382B, the connector distance A2 from the leading edge of the printing device to a rear edge 394 of communication connector 388, and the capture cavity inner edge distance A5 as between the inner surfaces of capture cavities 340A and 340B. As depicted, A2 measures 78.701 mm, A3 measures 62.940 mm, and A5 measures 47.552 mm.

As will be appreciated by one of ordinary skill in the art, the printer is thus fully docked onto the cradle by means of a four-point attachment mechanism whereby the capture flanges 170A and 170B are sufficiently seated into the capture cavities 340A and 340B and the barbed ends of the first and second biased latches 140A and 140B are securely seated into the first recess 382A and the second recess 382B of the printer 300.

Example Biased Release Assembly

Cradles, such as cradle 100 illustrated in FIGS. 1A and 1B, 2A-2C, 4, and 5A-5B, may be further configured to disengage (e.g., release) a printing device, such as printing device 300.

Figure 5A:
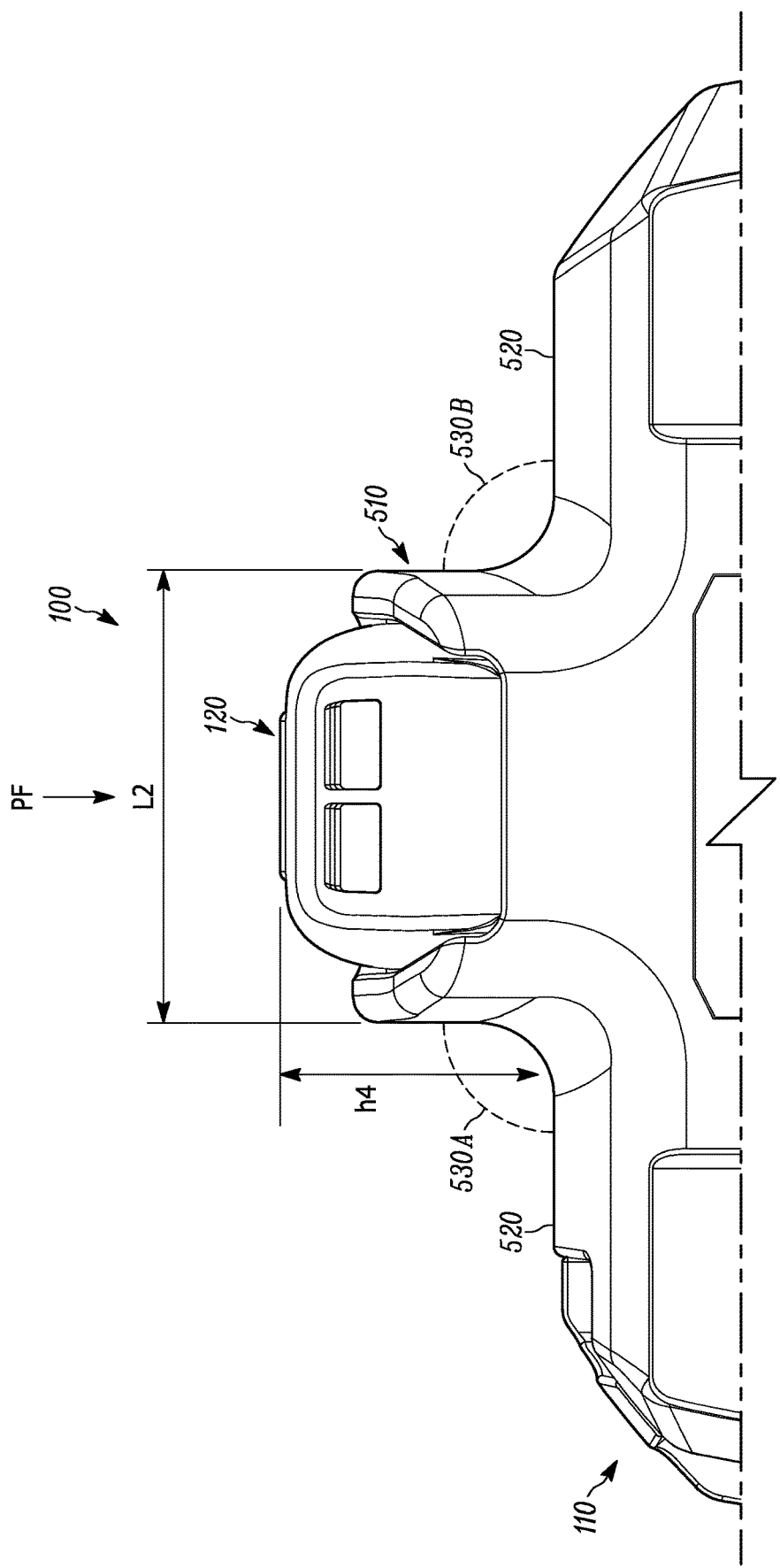
FIG. 5A illustrates a top detail view of a cradle structured in accordance with various embodiments.

With reference to FIG. 5A, cradle 100 also includes biased release member 120 configured to move between a first position and a release position. In the first position (e.g., at the position measuring α, here depicted in FIG. 5D as 110 degrees), biased release member 120 is positioned so as to not engage the first and second biased latches 140A and 140B to move rearward against bias force BF and is generally positioned as shown in FIG. 4, 5A, 5B, or 5D. Said differently, the first position is the position of biased release member 120 prior to being actuated (e.g., depressed) by a user as shown in FIGS. 6A, 6B.

Cradle body 110 further defines upper neck surface 510 disposed between first and second shoulder surfaces 520. Upper neck surface 510 measures a height h4 of 26.554 mm and a length L2 of 44.700 mm as depicted. As depicted, upper neck surface 510 and first and second shoulder surfaces 520 define neck supporting angles 530A and 530B. In the preferred embodiment depicted, neck supporting angles 530A and 530B measure 90 degrees. In some embodiments, neck supporting angles 530A and 530B may be configured to measure between 0 to 180 degrees.

Although biased release member 120 is configured to extend from upper neck surface 510, in some embodiments, biased release member 120 may extend from cradle body 110 without the surrounding upper neck surface 510. Alternatively, or additionally, biased release member 120 may extend outwardly in response to a depressed contact (e.g., the user presses biased release member) performed by a user on the surface of biased release member 120 as described herein with reference to FIGS. 6A and 6B.

In some embodiments, biased release member 120 may include a spring configured to oppose, to some degree, a pressing force applied to the biased release member 120 by a user. In preferred embodiments, 3 lbs. (e.g., at the bottom produced by one finger) is the pressing force PF applied to biased release member 120.

Figure 5B:
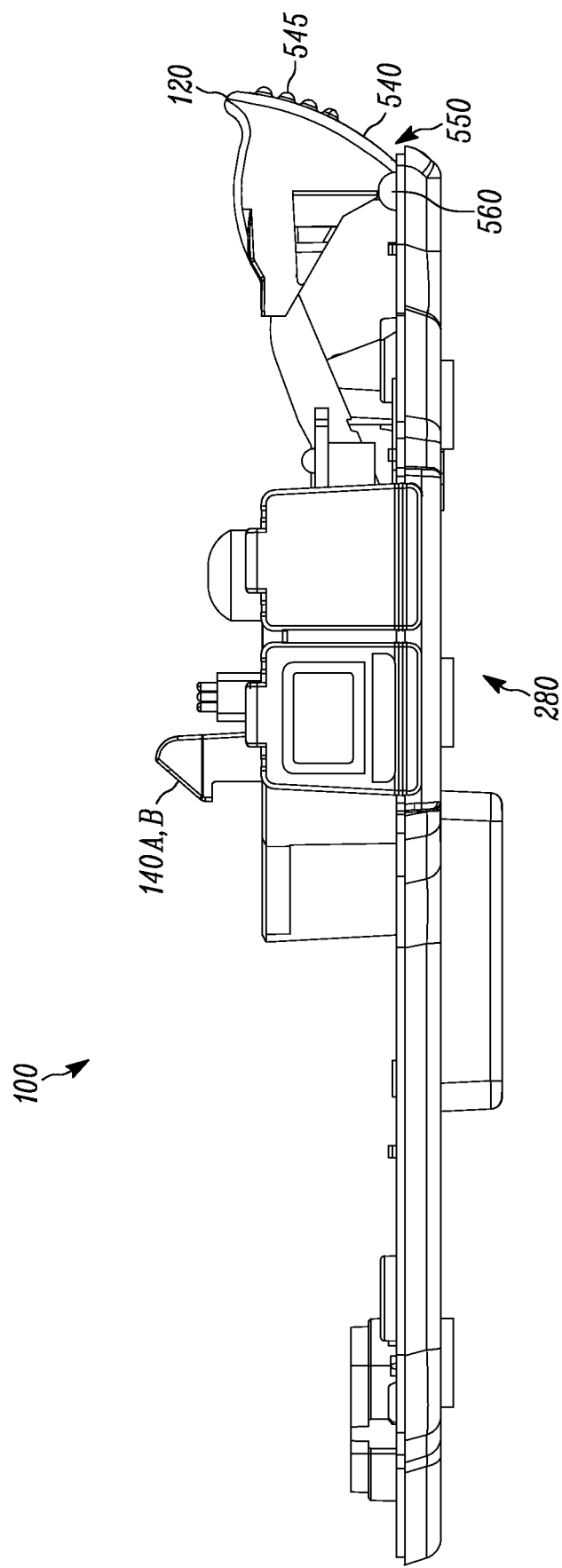
FIG. 5B illustrates a side cutaway view of an exemplary cradle structured in accordance with certain embodiments.
Figure 6B:
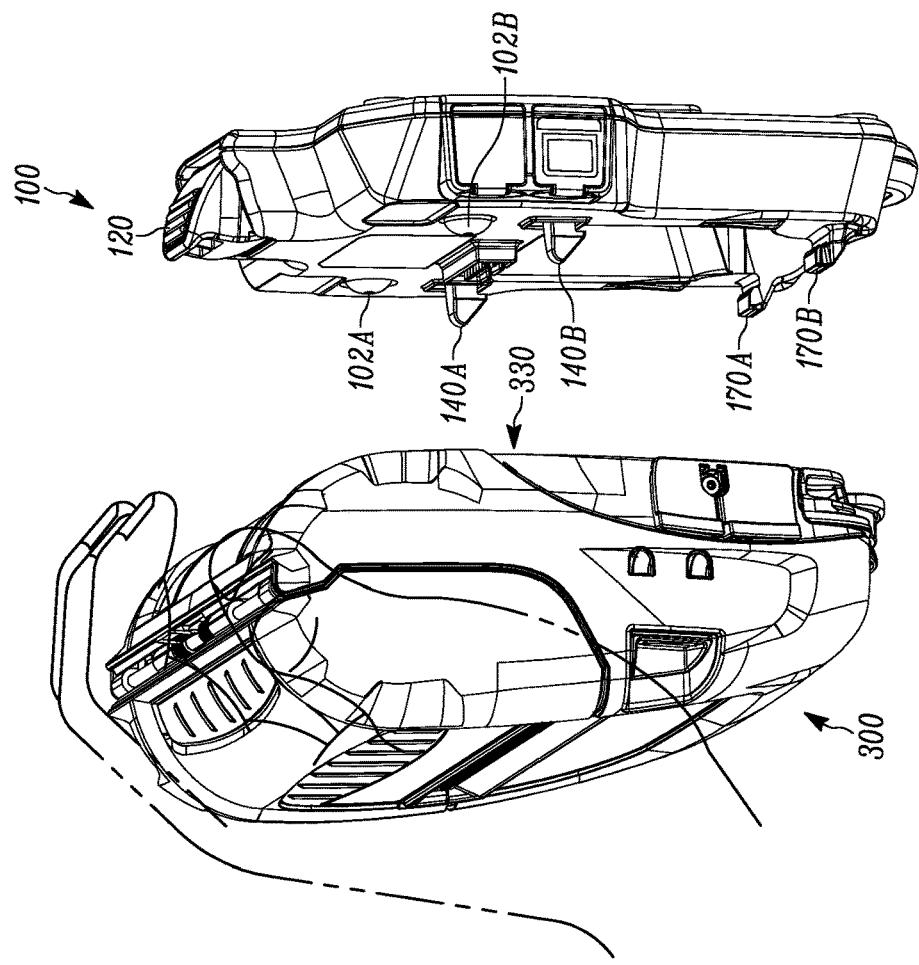
FIG. 6B illustrates an exemplary side view of a user disengaging a printing device from a cradle in accordance with various embodiments.
Figure 6A:
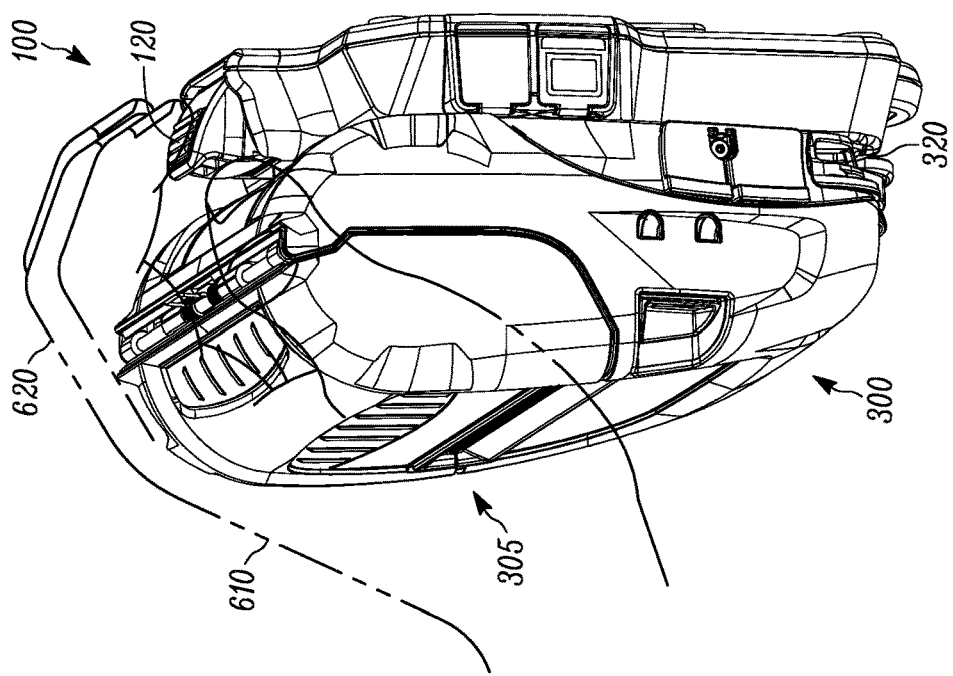
FIG. 6A illustrates a side perspective view of a user disengaging a printing device from a cradle in accordance with various embodiments.
Figure 7A:
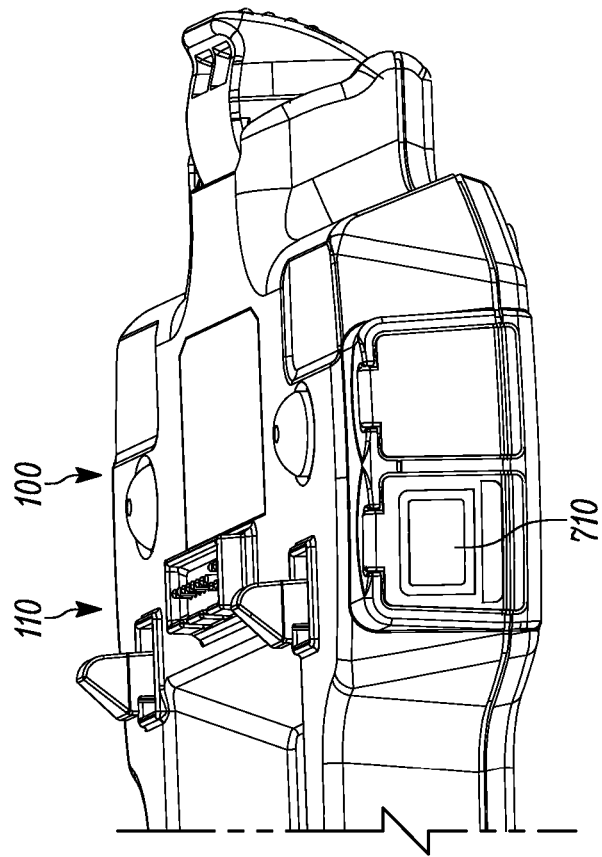
FIG. 7A illustrates a side perspective view of an exemplary cradle in accordance with various embodiments.
Figure 7B:
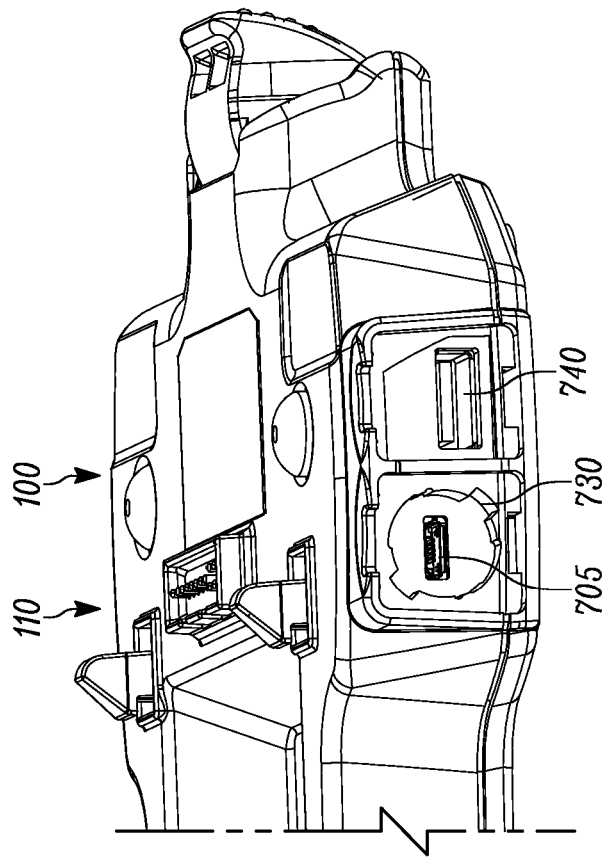
FIG. 7B illustrates a side perspective view of an exemplary cradle in accordance with various embodiments.

FIG. 5B illustrates a side cutaway view of cradle 100 that includes biased release member 120. Biased release member 120 is structured for engagement by one or more fingers and is thereby configured to include surfaces that are easily gripped. In the depicted embodiment, biased release member 120 is configured to be depressed by a user as shown in FIGS. 6A, 6B. For example, as a single hand holds and/or grips a printing device (e.g., printing device 300), various portions of the hand (e.g., distal phalanges, intermediate phalanges, proximal phalanges, metacarpals, or carpals) may depress (e.g., push, pull, and/or touch) biased release member 120. The force applied to biased release member 120 thereby actuates release linkage 565 as described herein below.

In the depicted embodiment, biased release member 120 includes angular contact surface 540. Angular contact surface 540 is structured to accommodate the arc of a hand or the arc produced by at least a portion of a hand as one or more fingers, for example, grip a printing device (e.g., printing device 300).

In further embodiments, angular contact surface 540 includes one or more ridged surfaces 545. Ridged surfaces 545 are ribs within or surrounding at least a portion of the angular contact surface 450 that are intended for engagement by a user's finger. Such ridged surfaces 545 are configured to ease wear and improve grip of biased release member 120 and/or cradle 100. For example, ridged surfaces 545 are configured to provide friction as between a hand, or portions thereof, and biased release member 120. Although four consecutive ridged surfaces 545 are illustrated in FIG. 5B, biased release member 120 may include a singular ridged surface or a plurality of ridged surfaces.

Figure 5C:
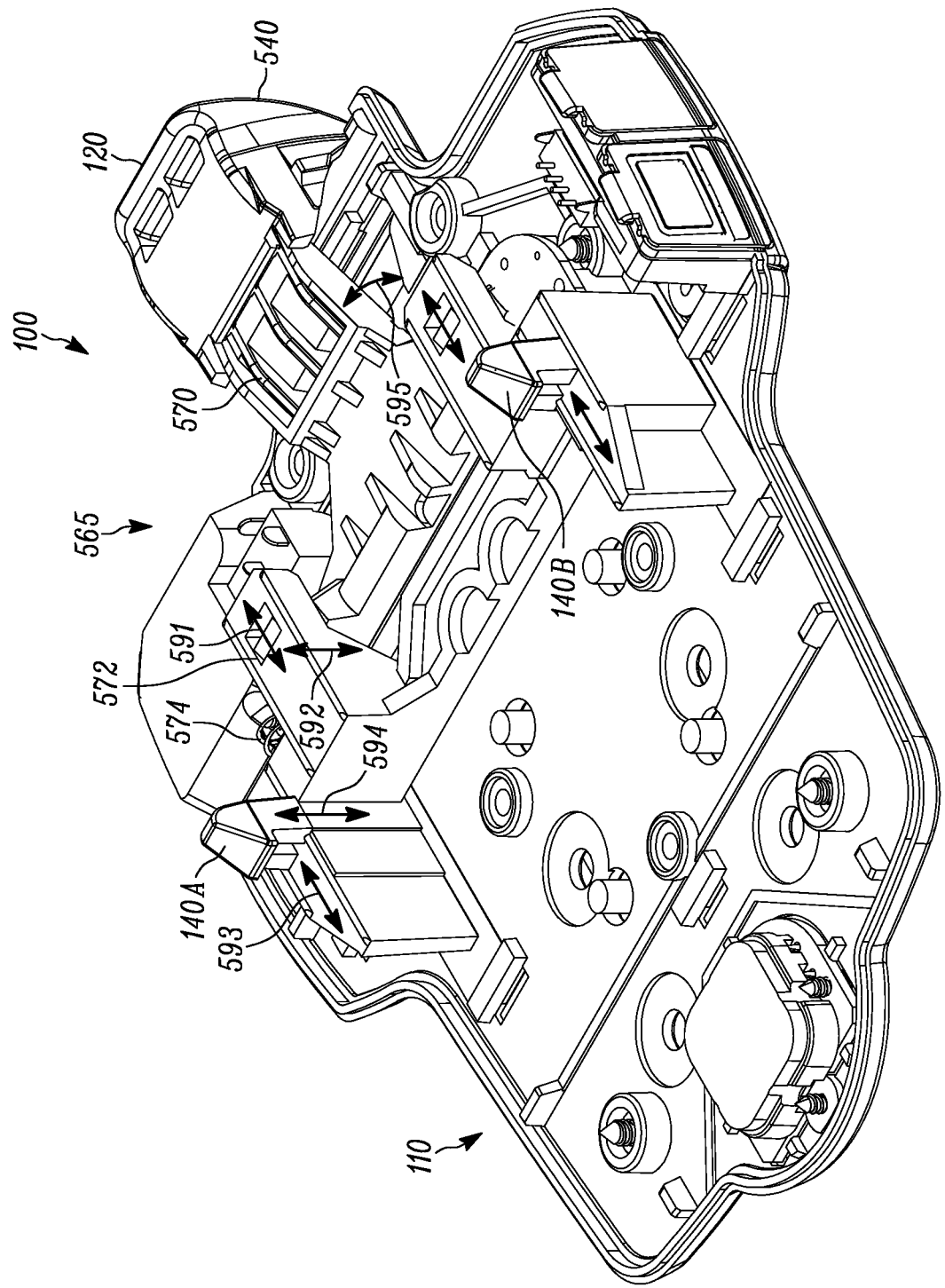
FIG. 5C illustrates a top perspective cutaway view of an exemplary cradle structured in accordance with certain embodiments.
Figure 5D:
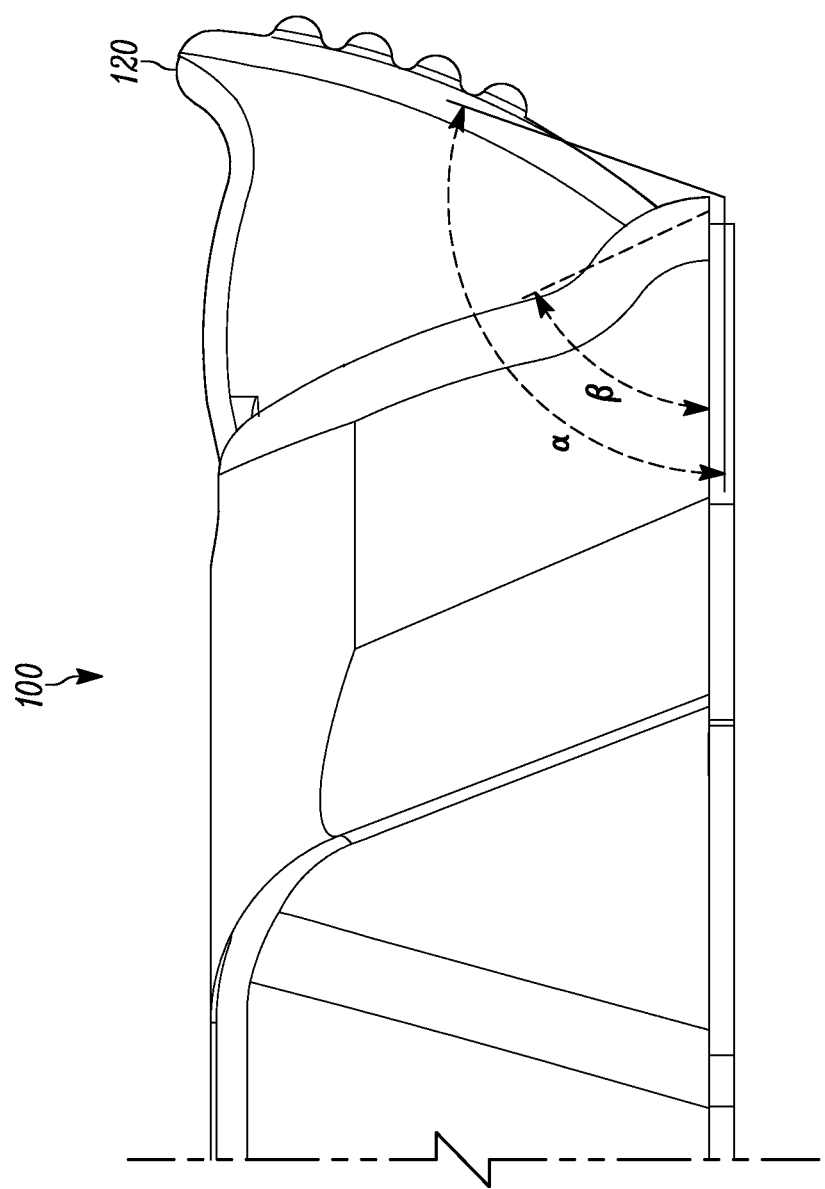
FIG. 5D illustrates a detail view of an exemplary cradle in accordance with various embodiments.

Biased release member 120 further defines pivoting member 560, or hinge, configured to turn or pivot biased release member 120 from a first position (e.g., 110 degrees, α, as depicted in FIG. 5D) to a release position (approximately 70 degrees, β, as depicted in FIG. 5D). At β, biased release member 120 is configured to allow a user's finger(s) to readily roll off the biased release member and onto the printing devices making the printing device easy to lift off of cradle 100.

The depicted pivoting member 560 is disposed between bottom surface 280 and angular base 550. In some embodiments, pivoting member 560 may be a hinge or other movable joint that connects a plurality of mechanical components. In the depicted embodiment, pivoting member 560 pivots approximately 40 degrees (i.e., between angles α and β). However, in alternative embodiments, pivoting member 560 may be configured to pivot between 30 and 60 degrees.

As illustrated in FIGS. 5B-5C and 6A-6B, cradle 100 includes first and second biased latches 140A and 140B as described herein above with reference to FIGS. 1A and 1B, 2A-2C, and 4. Each of first and second biased latches 140A and 140B are configured to move between a locked position as referenced in FIG. 4 and an unlocked position. When first and second biased latches 140A and 140B are in the unlocked position, printing device 300 may be readily removed from cradle 100. However, when first and second biased latches 140A and 140B are in the locked position, printing device 300 is securely docked, or engaged, with cradle 100. Further description of first and second biased latches 140A and 140B is described herein with reference to FIGS. 1A and 1B, 2A-2B, and 4.

As illustrated in FIG. 5C, cradle 100 further includes release linkage 565 supported by cradle body 110. Release linkage 565 is configured to transfer and transform the rotational pressing movement applied by the user to the biased release member 120 into a linear force that is configured to drive the first and second biased latches 140A and 140B rearward against biasing force BF (shown in FIG. 2A). In some embodiments, release linkage 565 is structured to drive first and second biased latches 140A and 140B from respective locked positions to respective unlocked positions in response to movement of biased release member 120 from a first position to a release position.

Release linkage 565 comprises connecting member 570, tabs 572, and/or springs 574. The depicted release linkage 565 is housed in one or more internal cavities defined by cradle body 110. However, in other embodiments, release linkage 110 may be disposed external to cradle body 110. Yet, in some embodiments at least a portion of release linkage 565 may be housed in one or more internal cavities defined by cradle body 110. For example, connecting member 570 as described herein below may be externally coupled to cradle body 110, while other elements of release linkage 565 may be housed in one or more internal cavities defined by cradle body 110.

Connecting member 570 is configured to drive tabs 572 in response to biased release member 120 being moved into a release position. In the depicted embodiment, the connecting member 570 takes the form of a lever. In some embodiments, connecting member 570 may take the form of, for example, a lever, knuckle joint, turnbuckle, or any other mechanical connector or fastening device configured for motion. In the depicted embodiment, connecting member 570 moves in an up or down direction as indicated by the arrows 595. Connecting member 570 may be made from plastic(s), rubber, metal, composite material, any other type of material, or combination thereof.

For example, when biased release member 120 is depressed (e.g., in a released position), biased release member 120 depresses (e.g., pushes down) connecting member 570 and tabs 572 move in a forward and backwards direction as indicated by the arrows 591. Tabs 572 may move in an up or down direction as indicated by the arrows 592. In preferred embodiments, when tabs 572 move in a forward and backwards direction, tabs 572 move from a shift position to a fixed position. In some embodiments, tabs 572 may be in a shift position when tabs 572 execute a motion, movement, or the like. Alternatively, or additionally, tabs 572 may be in a fixed position when tabs 572 are in a state of being motionless or at rest.

In the embodiment depicted, biased release member 120 is configured to actuate a spring-biased release of the printing device from the cradle body. In such example embodiments, release linkage 565 further includes springs 574 configured to drive first and second biased latches 140A and 140B from an unlocked position to a locked position. It should be appreciated that one or more springs 574 may be configured to drive first and second biased latches 140A and 140B. First and second biased latches 140A and 140B are configured to move in a forward or backward direction as indicated by the arrows 593. However, in some embodiments, first and second biased latches 140A and 140B may be configured to move in an up or down direction as indicated by the arrows 594. Alternatively, first and second biased latches 140A and 140B may be configured to provide a spring-biased, damper-biased, or similar attachment of a cradle body to a printing device. In preferred embodiments, the spring takes the form of a compression spring comprising steel. Alternatively, springs 574 may take the form of tension springs, extension springs, compression springs, torsion springs, constant springs, variable springs, machined springs, flat springs, coil springs, belleville springs, main springs, spring washer, and/or the like.

Springs 574 are configured to apply a biasing force to first and second biased latches 140A and 140B as described with reference to FIG. 2A. The force applied by the springs 574 drives first and second biased latches 140A and 140B from the unlocked position to the locked position. The biasing forces of the springs may be overcome by the release linkage discussed above upon a user driving the biased release member 120 to a release position.

Example Cradle Detachment

With reference to FIGS. 6A and 6B, when a user desires to detach a printing device (e.g., printing device 300) from cradle 100, the user places his or her hand 610 on printer body 305. It should be appreciated that the cradle (e.g., cradle 100) is configured to detach printing device 300 as a user utilizes a single hand (e.g., a left or right hand). At least a portion of hand 610 interfaces with biased release member 120. For example, various portions of hand 610 (e.g., the distal phalanges and intermediate phalanges) depress (e.g., push) biased release member 120. The force applied to biased release member 120 thereby actuates release linkage 565 in response to the movement of biased release member 120 from a first position to the release position as described herein with reference to FIGS. 5A-5C. Release linkage 565 simultaneously drives first and second biased latches 140A and 140B from a locked position to an unlocked position as described herein with reference to FIGS. 5B-5C. To that end, cradle engagement surface 330 defined by printing device 300 may be tilted away from cradle 100 and the capture flanges 170A, 170B may be removed from the capture cavities 340A, 340B as illustrated in FIG. 6B.

Example External Device Interface

Figure 1B:
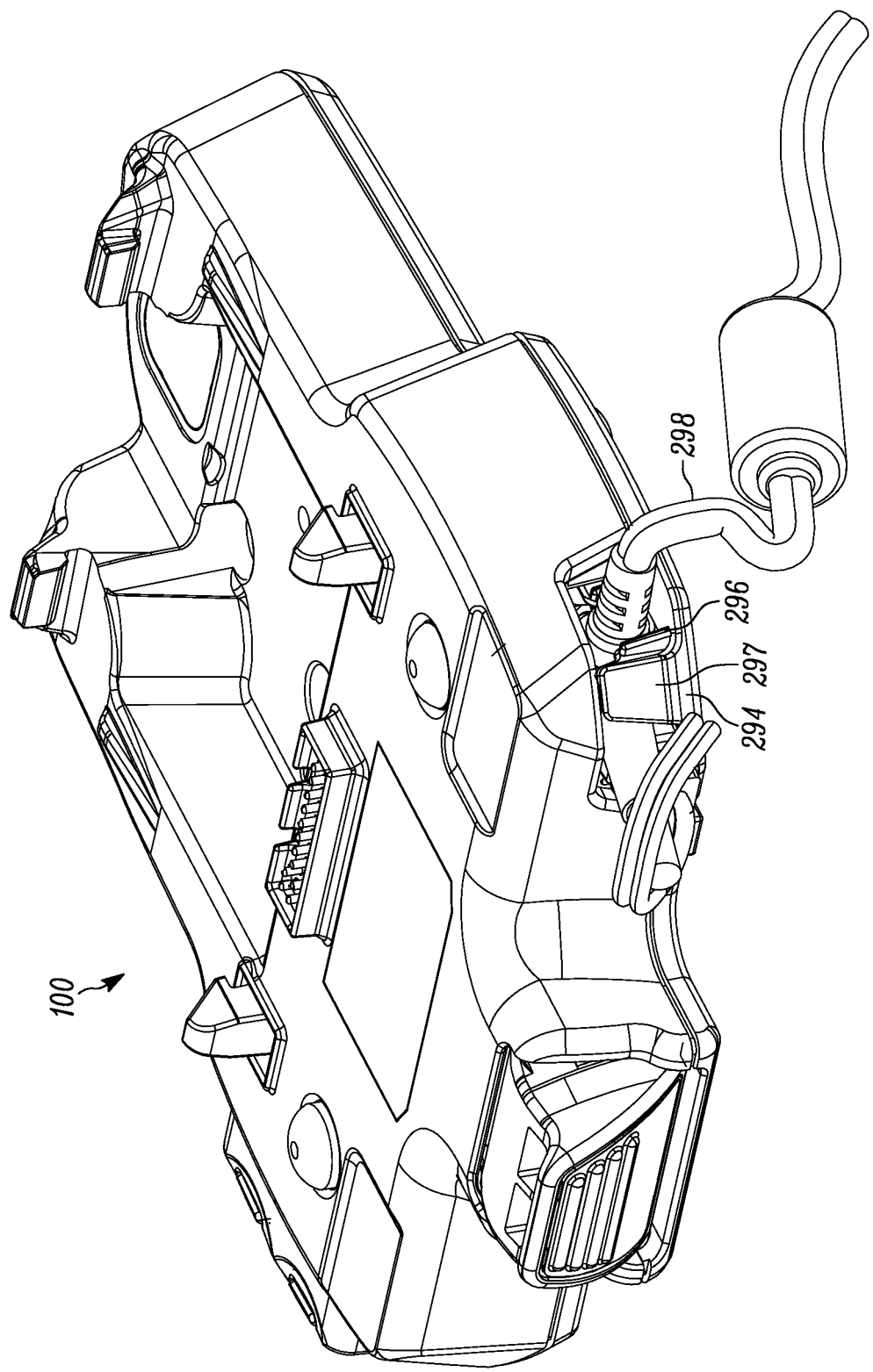
FIG. 1B illustrates a perspective view of an exemplary cradle structured in accordance with certain embodiments.

FIGS. 1A-B and 7A-B illustrate various views of cradle 100. In the depicted embodiment, cradle 100 is configured to interface with one or more external devices. As illustrated, cradle 100 includes one or more device receivers 705 housed in an internal cavity defined by cradle body 110. A receiver cover 710 is configured to protect device receiver 705. Receiver cover 710 may be removed and/or opened to access the protected component(s) (e.g. device receiver 705). In further embodiments, one or more device receivers 705 are configured to define one or more peripheral strain relievers 730. The peripheral strain reliever 730 as depicted here is a twist lock strain relief. Peripheral strain reliever(s) may be coupled to one or more external devices, for example, direct current (DC) member 294 (illustrated in FIGS. 1B and 2C) comprising an angle at, or between, the range of 90 to 180 degrees. U-shaped strain relief fork 297 extends from strain relief door 296 which is hinged to move between open and closed positions. In a closed position as shown in FIG. 1B, u-shaped strain relief fork 297 captures the connector end of DC member 294 (i.e., a power cord) as illustrated. In this regard, the inadvertent removal of the cord 298 and resulting wear and tear are eliminated or reduced.

Receiver cover 710 is removed to expose one or more device receivers 705. One or more device receivers 705 are configured to communicate with one or more devices that support external devices, for example, a barcode scanner, power source, accessory device, network device, and/or other apparatus to be coupled with the circuitry of cradle 100 and/or printing device 300. In the depicted embodiment, device receiver 705 is a USB connection configured for communication with a peripheral device such as a bar code scanner. In the depicted embodiment, cradle 100 is configured to accept and/or work with accessories common to other types or models of devices. In other embodiments, cradle 100 is configured to accept and/or work with accessories common to other types or models of devices. For example the depicted cradle is configured with a device port 740 (e.g., a USB host port) that is configured for electrical communication with one or more external devices. The depicted embodiment also includes DC member 294 (illustrated in Figured 1B and 2C) which provides a power source to cradle 100 that may utilized to charge the battery pack of a printing device (e.g., printing device 300).

Various other features for, modifications to and other embodiments of the inventions set forth herein will come to mind to one skilled in the art to which these inventions pertain having the benefit of the teachings presented in the foregoing descriptions and the associated drawings. For example, while examples discussed herein are often related to printing devices (e.g., mobile printing devices), one skilled in the art would appreciate that various types of printers, such as desktop or less mobile printers, as well as other types of devices may benefit from embodiments discussed herein. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

That which is claimed:

1. A cradle comprising:
 a cradle body configured to support a printing device, the cradle body defining a capture end and a release end;
 first and second printer capture flanges extending from the cradle body proximate the capture end of the cradle body;
 first and second biased latches extending from the cradle body between the capture end and the release end of the cradle body, wherein each of the first and second biased latches are movable between a locked position and an unlocked position;
a biased release member movable between a first position and a release position; and
a release linkage supported by the cradle body, the release linkage coupling the biased release member and the first and second biased latches, wherein the release linkage is structured to drive the first and second biased latches from respective locked positions to respective unlocked positions in response to movement of the biased release member from the first position to the release position, wherein the first and the second biased latches move in a direction towards the biased release member when moving from the respective locked position to the respective unlocked position.

2. The cradle of claim 1, wherein each of the first and second printer capture flanges defines a support portion and a capture portion.

3. The cradle of claim 1, wherein each of the first and second biased latches defines a printer drive surface and a lock surface.

4. The cradle of claim 1, wherein the biased release member is configured to actuate the release linkage.

5. The cradle of claim 1, wherein the release linkage is configured to transfer rotational pressing movement applied to the biased release member into a linear force, and the linear force is to drive the first and second biased latches against a biasing force.

6. The cradle of claim 1, wherein the release linkage comprises:
a connecting member configured to drive one or more tabs in response to the biased release member being moved into the release position; and
a spring configured to drive the first and second biased latches from the locked position to the unlocked position.

7. The cradle of claim 6, wherein the spring is configured to oppose a pressing force applied to the biased release member.

8. The cradle of claim 1, wherein the biased release member is configured to actuate a spring-biased release of the printing device from the cradle body.

9. The cradle of claim 1, wherein the first and the second biased latches are actuated in response to a user driving the biased release member from the first position to the release position.

10. The cradle of claim 1, wherein the cradle body defines an upper neck surface disposed between first and second shoulder surfaces.

11. The cradle of claim 10, wherein the biased release member extends from the upper neck surface.

12. The cradle of claim 1, wherein the biased release member comprises an angular contact surface structured to accommodate an arc of a hand produced by at least a portion of a hand.

13. The cradle of claim 1, wherein the biased release member defines a pivoting member configured to turn or pivot the biased release member from the first position to the release position.

14. The cradle of claim 1, further comprising one or more device receivers housed in an internal cavity defined by the cradle body, the one or more device receivers configured to communicate with one or more external devices.

15. The cradle of claim 14, wherein the one or more device receivers are configured to supply electrical energy to the one or more external devices.

16. The cradle of claim 1, wherein the cradle body comprises a bottom surface defining one or more drains and one or more protrusions configured for mounting on a surface.

17. A method of manufacturing a cradle for supporting a printing device, the method comprising:
providing a cradle body defining a capture end and a release end; extending first and second printer capture flanges from the cradle body proximate the capture end of the cradle body; extending first and second biased latches from the cradle body between the capture end and release end of the cradle body wherein each of the first and second biased latches are movable between a locked position and an unlocked position;
extending a biased release member movable between a first position and a release position from the cradle body; and
coupling, via a release linkage supported by the cradle body, the biased release member and the first and second biased latches, wherein the release linkage is structured to drive the first and second biased latches from respective locked positions to respective unlocked positions in response to movement of the biased release member from the first position to the release position, wherein the first and the second biased latches move in a direction towards the biased release member when moving from the respective locked position to the respective unlocked position.

18. The method of claim 17, wherein the release linkage is configured to transfer rotational pressing movement applied to the biased release member into a linear force, and the linear force is to drive the first and second biased latches against a biasing force.

19. The method of claim 17, wherein the release linkage comprises:
a connecting member configured to drive one or more tabs in response to the biased release member being moved into the release position; and
a spring configured to drive the first and second biased latches from the locked position to the unlocked position.

20. The method of claim 17, wherein the biased release member is configured to actuate a spring-biased release of the printing device from the cradle body.

21. The method of claim 17, wherein the cradle body defines an upper neck surface disposed between a first shoulder surface and a second shoulder surface, and the biased release member extends from the upper neck surface.

22. The method of claim 17 further comprising communicating, via one or more device receivers, with one or more external devices, the one or more device receivers housed in an internal cavity defined by the cradle body.

* * * * *